(12) United States Patent
Phillips et al.

(10) Patent No.: US 7,868,591 B2
(45) Date of Patent: Jan. 11, 2011

(54) CORDLESS POWER SYSTEM

(75) Inventors: Steven J. Phillips, Ellicott City, MD (US); Jeffrey J. Francis, Nottingham, MD (US); Andrew E. Seman, Jr., White Marsh, MD (US); Daniele C. Brotto, Baltimore, MD (US); David A. Carrier, Aberdeen, MD (US); Danh Thanh Trinh, Parkville, MD (US); Christopher R. Yahnker, Raleigh, NC (US); James B. Watson, Fallston, MD (US); Daniel J. White, Baltimore, MD (US)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 12/701,055

(22) Filed: Feb. 5, 2010

(65) Prior Publication Data

US 2010/0141207 A1 Jun. 10, 2010

Related U.S. Application Data

(62) Division of application No. 11/251,371, filed on Oct. 14, 2005, now Pat. No. 7,688,028.

(60) Provisional application No. 60/619,843, filed on Oct. 18, 2004.

(51) Int. Cl.
*H02J 7/00* (2006.01)

(52) U.S. Cl. .................. 320/114; 320/112; 320/106; 320/134; 307/150

(58) Field of Classification Search .......... 320/112, 320/114; 307/150
See application file for complete search history.

(56) References Cited

U.S. PATENT DOCUMENTS 3,533,119 A 10/1970 Dokos
3,602,586 A 8/1971 Bartl et al.

(Continued)

OTHER PUBLICATIONS

International Search Report and Written Opinion for PCT/US05/37067, issued Dec. 7, 2007.

*Primary Examiner*—Edward Tso
*Assistant Examiner*—M'Baye Diao
(74) *Attorney, Agent, or Firm*—Michael Aronoff; Adan Ayala

(57) ABSTRACT

A cordless system has cordless system components that include a cordless device, such as a cordless power tool, a battery pack and a charger. The battery pack is mated with either the cordless device to provide power to operate the cordless device or to the charger to charge the battery cells in the battery pack. In an aspect of the invention, the cordless system has an identification and communication system by which the battery pack identifies and communicates information about the battery pack to the cordless device or to the charger to which the battery pack is mated. In another aspect of the invention, the battery pack of the cordless system is capable of multiple modes, such as controlling the cordless device and controlling the charger. In yet another aspect of the invention, the battery pack validates the cordless device or charger to which it is mated. In still another aspect of the invention, the cordless system uses any of a wired interface, radio frequency interface, an optical interface or a magnetic interface to communicate information between the battery pack and the cordless device or charger to which the battery pack is mated.

13 Claims, 17 Drawing Sheets

U.S. PATENT DOCUMENTS

| | | | |
|---|---|---|---|
| 3,637,298 A | 1/1972 | Whitley |
| 3,728,664 A | 4/1973 | Hurst |
| 3,952,239 A | 4/1976 | Owings et al. |
| 3,969,796 A | 7/1976 | Hodsdon et al. |
| 4,084,123 A | 4/1978 | Lineback et al. |
| 4,835,409 A | 5/1989 | Bhagwat et al. |
| 5,148,353 A | 9/1992 | Morgan et al. |
| 5,184,651 A | 2/1993 | Gawa et al. |
| 5,206,097 A | 4/1993 | Burns et al. |
| 5,208,525 A | 5/1993 | Lopic et al. |
| 5,289,885 A | 3/1994 | Sakoh et al. |
| 5,554,921 A | 9/1996 | Li et al. |
| 5,602,462 A | 2/1997 | Stich et al. |
| 5,701,244 A | 12/1997 | Emmert et al. |
| 5,850,134 A | 12/1998 | Oh et al. |
| 5,945,803 A | 8/1999 | Brotto et al. |
| 5,952,814 A | 9/1999 | Van Lerberghe et al. |
| 5,963,012 A | 10/1999 | Garcia et al. |
| 5,999,102 A | 12/1999 | Mitsui et al. |
| 6,038,892 A | 3/2000 | Schmitt |
| 6,040,680 A | 3/2000 | Toya et al. |
| 6,057,608 A | 5/2000 | Bailey, Jr. et al. |
| 6,066,938 A | 5/2000 | Hyodo et al. |
| 6,067,041 A | 5/2000 | Kaiser et al. |
| 6,104,163 A * | 8/2000 | Komatsu et al. ............ 320/116 |
| 6,168,881 B1 | 1/2001 | Fischer et al. |
| 6,175,211 B1 | 1/2001 | Brotto |
| 6,184,651 B1 | 2/2001 | Fernandez et al. |
| 6,191,554 B1 | 2/2001 | Nakane et al. |
| 6,237,698 B1 | 5/2001 | Carrier et al. |
| 6,285,158 B1 | 9/2001 | Higuchi |
| 6,286,609 B1 | 9/2001 | Carrier et al. |
| 6,296,065 B1 | 10/2001 | Carrier |
| 6,304,058 B2 | 10/2001 | Watson et al. |
| 6,324,339 B1 | 11/2001 | Hudson et al. |
| 6,362,596 B1 | 3/2002 | Brotto |
| 6,429,622 B1 | 8/2002 | Svensson |
| 6,504,341 B2 | 1/2003 | Brotto |
| 6,515,451 B2 | 2/2003 | Watson et al. |
| 6,522,100 B2 | 2/2003 | Hansford |
| 6,607,041 B2 | 8/2003 | Suzuki et al. |
| 6,653,815 B2 | 11/2003 | Watson et al. |
| 6,803,744 B1 | 10/2004 | Sabo |
| 6,876,173 B2 | 4/2005 | Mastaler et al. |
| 7,014,945 B2 | 3/2006 | Moores, Jr. et al. |
| 7,079,038 B2 | 7/2006 | Wendelrup et al. |
| 7,109,682 B2 | 9/2006 | Takagi et al. |
| 7,160,132 B2 | 1/2007 | Phillips et al. |
| 7,164,257 B2 | 1/2007 | Johnson et al. |
| 7,227,333 B2 | 6/2007 | Yamada et al. |
| 7,439,706 B2 | 10/2008 | Brenner |
| 2002/0149346 A1 | 10/2002 | Sakakibara |
| 2003/0091882 A1 | 5/2003 | Schmidt et al. |
| 2003/0096160 A1 | 5/2003 | Sugiura et al. |
| 2003/0174449 A1 | 9/2003 | Yamamoto |
| 2003/0175560 A1 | 9/2003 | Kim et al. |
| 2003/0193245 A1 | 10/2003 | Powers |
| 2004/0135542 A1 | 7/2004 | Ito |
| 2004/0145487 A1 | 7/2004 | Wendelrup et al. |
| 2004/0160212 A1 | 8/2004 | Mastaler et al. |
| 2004/0257038 A1 | 12/2004 | Johnson et al. |
| 2004/0263119 A1 | 12/2004 | Meyer et al. |
| 2005/0007068 A1 | 1/2005 | Johnson et al. |
| 2005/0035738 A1 | 2/2005 | Patino et al. |
| 2005/0057224 A1 | 3/2005 | Naitoh et al. |
| 2005/0077878 A1 * | 4/2005 | Carrier et al. ............... 320/134 |
| 2006/0005055 A1 | 1/2006 | Potega |
| 2006/0022637 A1 | 2/2006 | Wang et al. |
| 2006/0220612 A1 | 10/2006 | Feldmann et al. |

* cited by examiner

CORDLESS POWER SYSTEM

CROSS-REFERENCE TO RELATED APPLICATIONS

This application is a divisional of U.S. application Ser. No. 11/251,371, filed Oct. 14, 2005 which claims the benefit of U.S. Provisional Application No. 60/619,843, filed on Oct. 18, 2004. The entire disclosures of the above applications are incorporated herein by reference.

FIELD OF THE INVENTION

The present invention relates to cordless power systems, and more particularly, to a cordless system in which the cordless system components include a cordless power device, a battery pack, and a charger.

BACKGROUND OF THE INVENTION

Cordless products which use rechargeable batteries are prevalent throughout the workplace as well as in the home. From housewares to power tools, rechargeable batteries are used in numerous devices. Ordinarily, nickel-cadmium or nickel-metal-hydride battery cells are used in these devices. Since the devices use a plurality of battery cells, the battery cells are ordinarily packaged as battery packs. These battery packs couple with the cordless devices and secure to the device. The battery pack may be removed from the cordless device and charged in a battery charger or charged in the cordless device itself.

SUMMARY OF THE INVENTION

A cordless system has cordless system components that include a cordless device, such as a cordless power tool, a battery pack and a charger. The battery pack is mated with either the cordless device to provide power to operate the cordless device or to the charger to charge the battery cells in the battery pack. In an aspect of the invention, the cordless system has an analog identification and communication system by which the battery pack identifies and communicates information about the battery pack to the cordless device or to the charger to which the battery pack is mated. In an aspect of the invention, the cordless system has a hybrid analog/digital identification and communication system. In an aspect of the invention, the cordless system has a digital only identification and communication system. In an aspect of the invention, the cordless system has a mechanical identification system.

In an aspect of the invention, the battery pack of the cordless system is capable of multiple modes, such as controlling the cordless device and controlling the charger. In an aspect of the invention, the battery pack validates the cordless device or charger to which it is mated.

In an aspect of the invention, the cordless system uses any of a wired interface, radio frequency interface, an optical interface or a magnetic interface to communicate information between the battery pack and the cordless device or charger to which the battery pack is mated.

In an aspect of the invention, female terminals are used in a terminal block of the battery pack to protect against foreign objects contacting the terminals.

In aspect of the invention, the terminals in the terminal block of the battery pack are staggered or scattered to reduce the likelihood of a short circuit.

In an aspect of the invention, the battery pack has a trap door that closes when the battery pack is not mated to a cordless device or charger to protect the terminal block of the battery pack.

In an aspect of the invention, multi-spring, split contact terminals are used in the terminal block of at least one of the cordless system components. In an aspect of the invention, the multi-spring, spilt contact terminals are used in the terminal block of the battery pack.

In an aspect of the invention, the cordless device is a cordless power tool having a push-pull trigger that both controls the speed of the motor of the cordless power tool and reverses the direction of the motor. In an aspect of the invention, the battery pack includes a controller that controls the motor of the cordless power tool. In an aspect of the invention, linearity adjustment potentiometers are provided to allow control resolution of the resistance of a potentiometer of the trigger to be set among exponential resolution, logarithmic resolution, and linear resolution.

In an aspect of the invention, the battery cells are lithium ion cells and the cordless device is a cordless power tool that includes soft braking.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
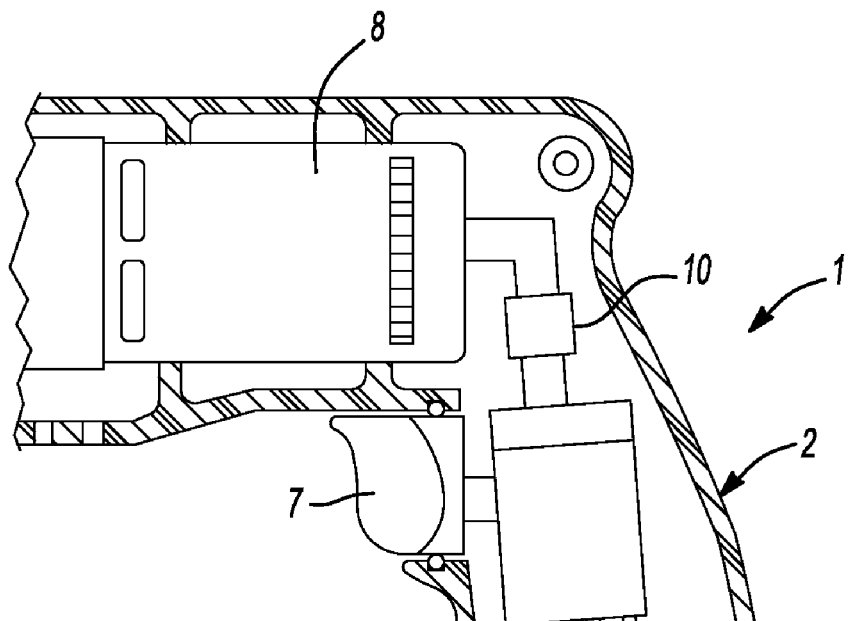
FIG. 1 is a side sectional view of a cordless power tool.
Figure 1:
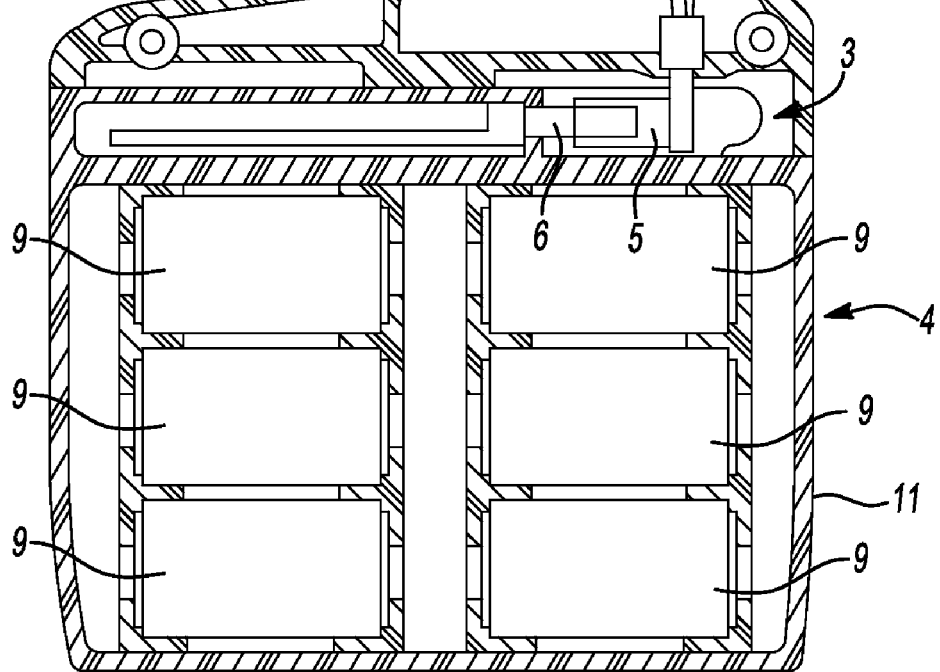

With reference to FIG. 1, a cordless device, such as a power tool, is illustrated and designated with reference numeral 1. The cordless power tool 1 ordinarily includes a clam shell type housing 2. The housing 2 includes a mechanism 3 to couple the housing 2 with a battery pack 4. The cordless device 1 includes electrical elements 5, typically included in a terminal block (not shown in FIG. 1), which couple with corresponding electrical elements 6 of the battery pack 4, also typically included in a terminal block (not shown in FIG. 1). The cordless power tool 1 includes a trigger 7, such as a trigger switch and which may be referred to herein as trigger 7, which is activated for energizing a motor 8 provided within the housing 2, as is well known in the art. Motor 8 may illustratively be a permanent magnet DC motor of the type conventionally used in cordless power tools. Normally, a plurality of battery cells 9 are disposed within the battery pack 4. A controller 10 may be provided in housing 2 for controlling motor 8. The controller may alternatively (or additionally) be disposed in battery pack 4, identified with reference number 206 (FIG. 2A) and may also be used for controlling the charge of battery pack 4, as well as its discharge.

Figure 2A:
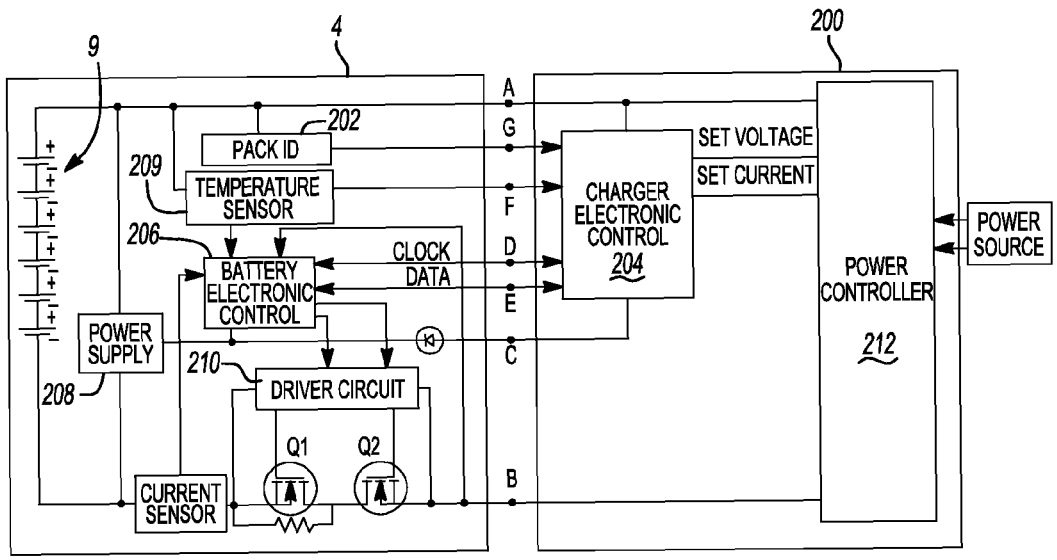
FIG. 2A is a schematic system diagram of the functional control of a battery pack and battery charger according to an aspect of the invention.
Figure 2B:
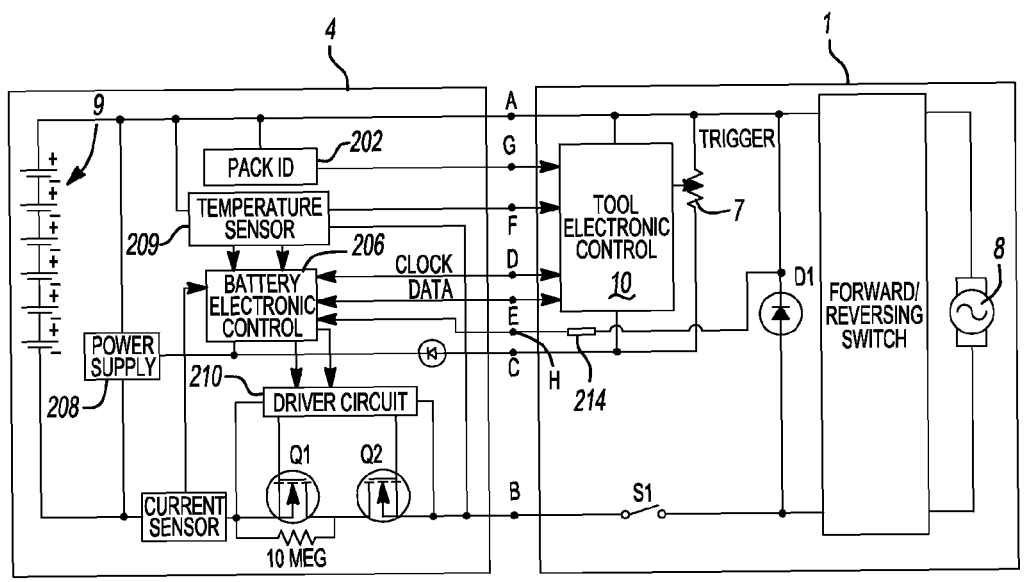
FIG. 2B is a schematic system diagram of the functional control of a battery pack and cordless power tool according to an aspect of the invention.

FIG. 2A shows a battery pack 4 coupled to a charger 200. The plurality of battery cells 9 are interconnected to provide the desired voltage and current. The power connections for charging and discharging the battery pack 4 are through terminals A and B. Inside the battery pack 4 there is a pack ID component 202 connected to charger 200 or cordless power tool 1 (FIG. 2B) through terminal G which, when used with the charger 200 or cordless power tool 1, can define the chemistry of battery cells 9, capacity of battery pack 4, and/or other characteristics to either the charger's controller 204 or the cordless power tool 1 controller 10 (FIG. 2B). Battery pack 4 may also have one or more temperature sensors (such as a thermistor) 209 connected to both the charger unit via terminal F and controller 206 inside the battery pack 4. The controller 206 may illustratively be responsible for the protection of the cells 9 for any condition exposed on the terminals A, B by the user (charger, tool, and/or user tampering). The discharge or charge current can be clamped or discontinued by the use of semi-conductor devices Q1 and Q2, which are illustratively MOSFETs. The controller 206 may illustratively be powered by a separate power supply, such as internal power supply 208. A driver circuit 210 may illustratively be disposed between controller 206 and control inputs of semi-conductor devices Q1, Q2.

When connected to a charger 200, the charger controller 204 can be powered from the battery pack 4's power supply 208 through terminals A and C. This is only exemplary as other means for powering the charger controller 204 can be employed. Battery and charger information can be exchanged via data terminals D and E. The charger controller 204 then will drive power controller 212 of charger 200 to deliver the desired voltage and current to the battery pack 4.

With reference to FIG. 2B, the battery pack 4 is shown connected to cordless power tool 1. Controller 10 of cordless power tool 1 can be powered from the battery pack 4 power supply 208 through terminals A and C. Cordless power tool 1 may contain a tool ID component 214 connected to battery pack controller 206 through terminal H. The cordless power tool 1 may contain a switch S1 that pulls terminal B high when the semi-conductor Q1 is off. If semi-conductor Q1 is left off while the battery pack 4 is dormant, and suddenly the switch S1 is pulled, terminal B could be used to wake the battery pack 4 from a dormant mode of operation. The cordless power tool controller 10 could be configured to read the trigger 7 position and report that data back to the battery pack controller 206 through data terminals D and E. The battery pack controller 206 will vary the PWM duty cycle of the power supplied to motor 8 of cordless power tool 1 through semi-conductor Q1 to power motor 8 at a desired motor speed. While semi-conductor Q1 is off, the diode D1 in cordless power tool 1 will re-circulate any inductive motor current to prevent voltage spikes. It should be understood that semi-conductor Q1 could alternatively be included in the cordless power tool 1 and controlled by cordless power tool controller 10 to vary the PWM duty cycle.

Cordless power tool 1, battery pack 4 and charger 200 may illustratively have a separate ground path, indicated by terminal C in FIGS. 2A and 2B, for the data lines, which are connected via terminals D and E in FIGS. 2A and 2B. Providing a separate ground path for the data signal connections, be they analog or digital, from the power connections on terminals A and B isolates the ground path for the data signals from the power connections. This reduces the possibility of charge or discharge currents traveling through the control circuits for the cordless system components. As used herein, a "system component" is a component that can be connected to another component of the cordless system and include, but are not limited to, battery packs, chargers, and cordless devices such as cordless power tools. The ground path isolation will also provide a reduction in electrical noise in analog and digital communication systems. The ground terminals C may illustratively be staggered in the terminal blocks used in the cordless system components so that the ground terminals of the cordless system components are the first terminals to make contact when battery pack 4 is mated to cordless power tool 1 or to charger 200. This allows the cordless power tool controller 10 or the charger controller 204 to be on before the cordless power tool 1 or the charger 200 is activated.

Figure 3:
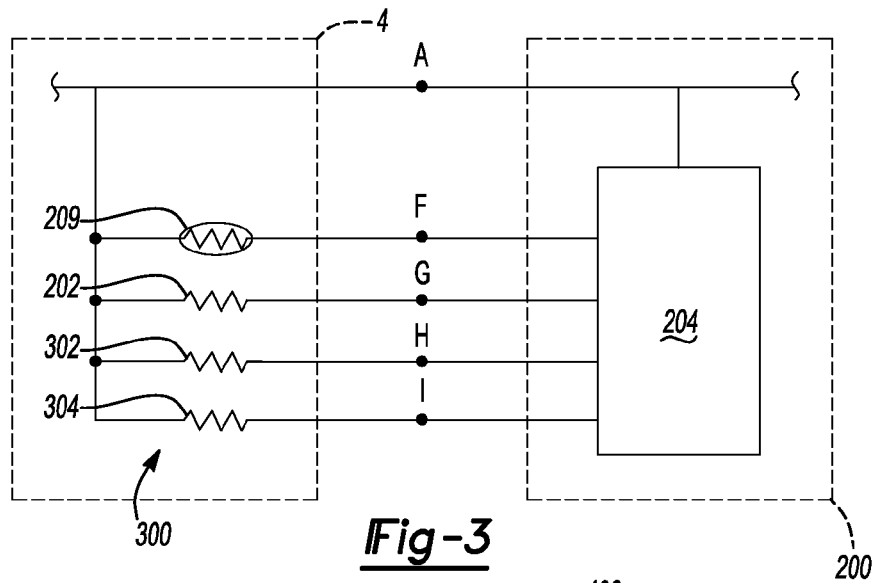
FIG. 3 is a simplified schematic diagram of an analog identification and communication system for a cordless system in accordance with an aspect of the invention.

Battery pack ID component 202 and tool ID component 214 may be one or more analog components, such as resistors, capacitors, or combinations thereof, or digital components. FIG. 3 shows a simplified schematic of an "analog only" identification system in which resistors in battery pack 4 identify characteristics of battery pack 4, such as temperature, charging voltage, charging current, to charger 200 or to cordless power tool 1, which then charge or discharge battery pack 4 accordingly. Pack ID component 202 is a resistor and the value of the resistance is used to identify the characteristics of battery pack 4 to charger 200 or cordless power tool 1, depending on whether battery pack 4 is connected to charger 200 or cordless power tool 1. With reference to FIG. 2B, tool ID component 214 is a resistor and the value of the resistance is used to identify the characteristics of cordless power tool 1 to battery pack controller 206. Other components, such as mechanical keys, lockout protrusions, magnetic sensing and the like can be used as ID components 202, 214.

Battery pack 4, charger 100 and cordless power tool 1 include ID and communication functions that provide a way for these various system components to identify and communicate data. The ID and communication functions can be implemented in various ways, as described in more detail below, that allow varying levels of information to be passed between the system components. The way in which the ID and communication functions are implemented in any particular component or cordless system would depend on the needs of the component or system, which would determine the type and amount of information needed to be communicated between two or more of the components in the system.

As described above with reference to FIGS. 2A and 2B, battery pack 4 includes a pack ID component 202 and a temperature sensor 209, which is illustratively a thermistor. In addition to battery pack ID component 202 and temperature sensor 209, analog identification and communication system 300 (FIG. 3) includes resistor 302 that identifies a voltage parameter of battery pack 4 and resistor 304 that identifies a current parameter of battery pack 4. Battery pack ID component 202 is illustratively a resistor. It should be understood, however, that other analog components could be used, such as capacitors, as well as combinations of different types of analog components, such as combinations of resistors and capacitors.

Battery pack ID component 202, temperature sensor 209, and resistors 302, 304 identify parameters of battery pack 4 to the system component to which battery pack 4 is connected, charger 200 in the case of the embodiment shown in FIG. 3. Charger 200 then uses this information, such as to control the charging of battery pack 4. For example, battery pack ID component 202 may illustratively identify the chemistry of battery pack 4, that is, the type of battery cells used in it, to charger 200. Illustrative types of battery cells are Nickel Cadmium cells, Nickel Metal Hydride cells, and Lithium Ion cells. Charger 200 would then charge the pack using the appropriate charge algorithms for the particular chemistry. Temperature sensor 209 would provide a signal to charger 200 indicative of the temperature of battery pack 4. Controller 204 of charger 200 then illustratively uses that battery pack 4 temperature information to control the charging of battery pack 4 so that charging does not occur when the temperature of battery pack 4 is outside of an acceptable temperature range for charging the battery pack 4. Resistor 302 may illustratively provide information about a voltage parameter of battery pack 4. For example, the value of resistor 302 may be used to indicate the voltage at which battery pack 4 is to be charged. Charger controller 204 then sets the voltage at which charger 200 charges battery pack 4 based on this value. Similarly, resistor 304 may illustratively provide information about a current parameter of battery pack 4. For example, the value of resistor 304 may be used to indicate the maximum current at which battery pack 4 is to be charged. Controller 204 of charger 200 then limits the current at which it charges battery pack 4 to be below this maximum current parameter.

One benefit of the analog only identification and communication 300 is that most or all of the system components can be kept electrically simple. But this may in turn limit the system features.

FIG. 4 shows a simplified schematic for a digital/analog hybrid identification and communication system 400. Elements in common with the embodiments shown in FIGS. 2A, 2B and 3 will be identified with like reference numbers, and the discussion will focus on the differences. While FIG. 4 shows battery pack 4 connected to charger 200, it should be understood that battery pack 4 could alternatively be connected to cordless power tool 1.

Figure 4A:
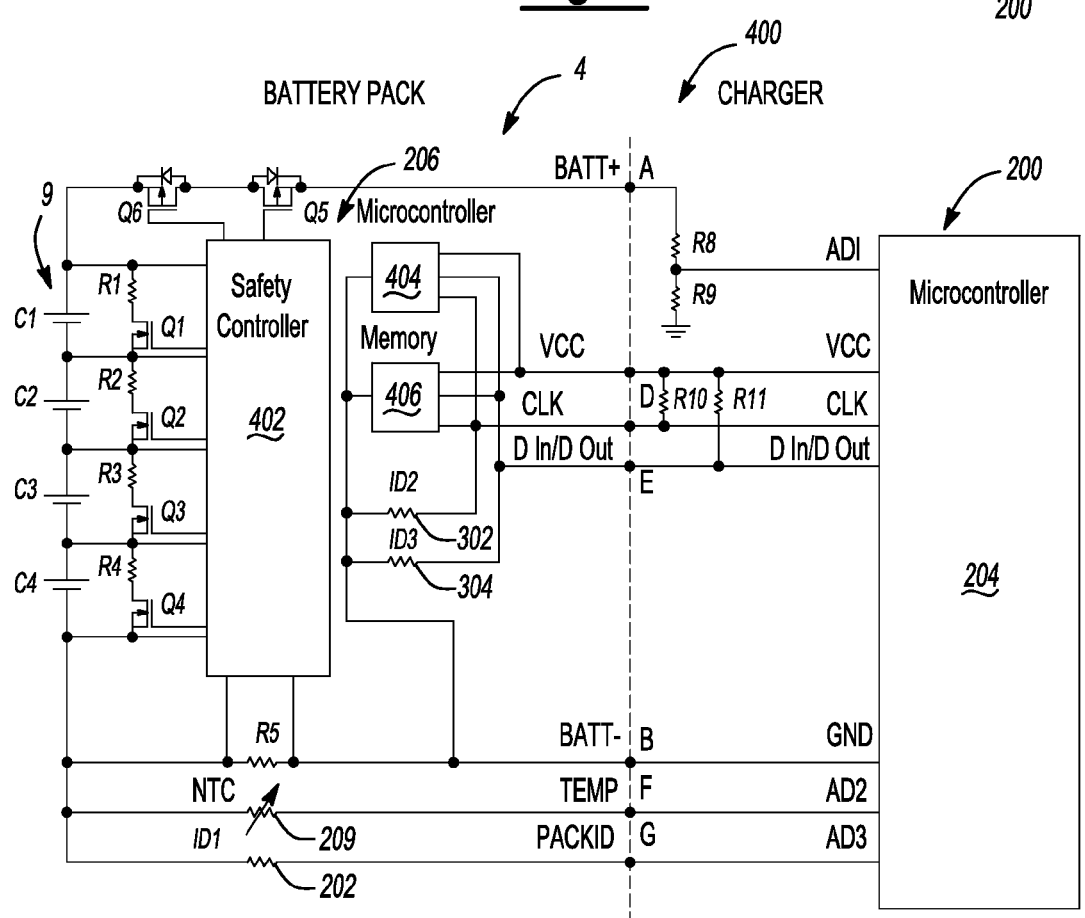
FIG. 4A is a simplified schematic diagram of a digital/analog hybrid identification and communication system for a cordless system in accordance with an aspect of the invention.

In the embodiment of FIG. 4A, controller 206 of battery pack 4 is shown as having a safety controller 402, a microcontroller 404 and a memory 406 coupled to microcontroller 404. It should be understood that these could be separate elements, or combined in a single element, such as a microcomputer. Digital/analog hybrid identification and communication system 400 uses memory 406, which may illustratively be a serial memory device, and/or microcontroller 404 to provide information about battery pack 4 to the system component to which battery pack 4 is connected, which is charger 200 in the embodiment shown in FIG. 4. Battery pack ID component 202, illustratively a resistor in the embodiment of FIG. 4, temperature sensor 209, voltage resistor 302 and current resistor 304 provide information to charger 200 as described above with reference to FIG. 3. The information provided by microcontroller 404 and/or memory device 406 may include information about other parameters of battery pack 4, such as temperature limits, voltage limits, current limits, serial identification numbers, hardware revision numbers, software revision numbers, cooling capabilities, number of charge cycles completed, number of discharge cycles completed, remaining capacity, battery pack impedance, or fault conditions, or may be more detailed information complementing the information provided by the analog elements. Using a non-volatile memory element for at least part of memory 406 allows for readable and writeable information that can be updated by controller 206 in the battery pack 4, controller 10 in cordless power tool 1, and/or controller 204 in charger 200. By using both analog components and digital data to provide information to charger 200, the simplicity of the analog system can be maintained yet more information communicated with the digital data. It should be understood that battery pack 4 may utilize only a digital component(s), such as memory 406, to store the information that is provided to charger 200. In this regard, charger 200 may clock the data out of memory 206, such as where battery pack 4 is a "dumb" battery pack, that is, does not have controller 206.

The digital data communication interface between battery pack 4 and charger 200 may illustratively be a two wire system. But it should be understood that other interfaces can be used, such as a by way of example and not of limitation, a single wire system, a 3 wire system, a synchronous system, or an asynchronous system. The interface may illustratively be hardwired, as shown in FIG. 4, or wireless, as discussed in more detail below. Also, the digital data could be multiplexed over other lines, such as the power lines connected via terminals A, B, or other lines such as those connected via terminals F, G.

An advantage of the hybrid analog/digital identification and communication system 400 is that charger 200 or cordless power tool 1 are capable of interfacing with battery packs 4 having different levels of intelligence, such as microcontroller based, memory based, and/or or analog based intelligence. The charger 200 or cordless power tool 1, whichever is connected to the battery pack 4, performs a series of checks over the lines that interconnect the charger 200 or cordless power tool 1 to the battery pack 4 to determine the level of intelligence and the type of communication interface in the battery pack 4.

Figure 4B:
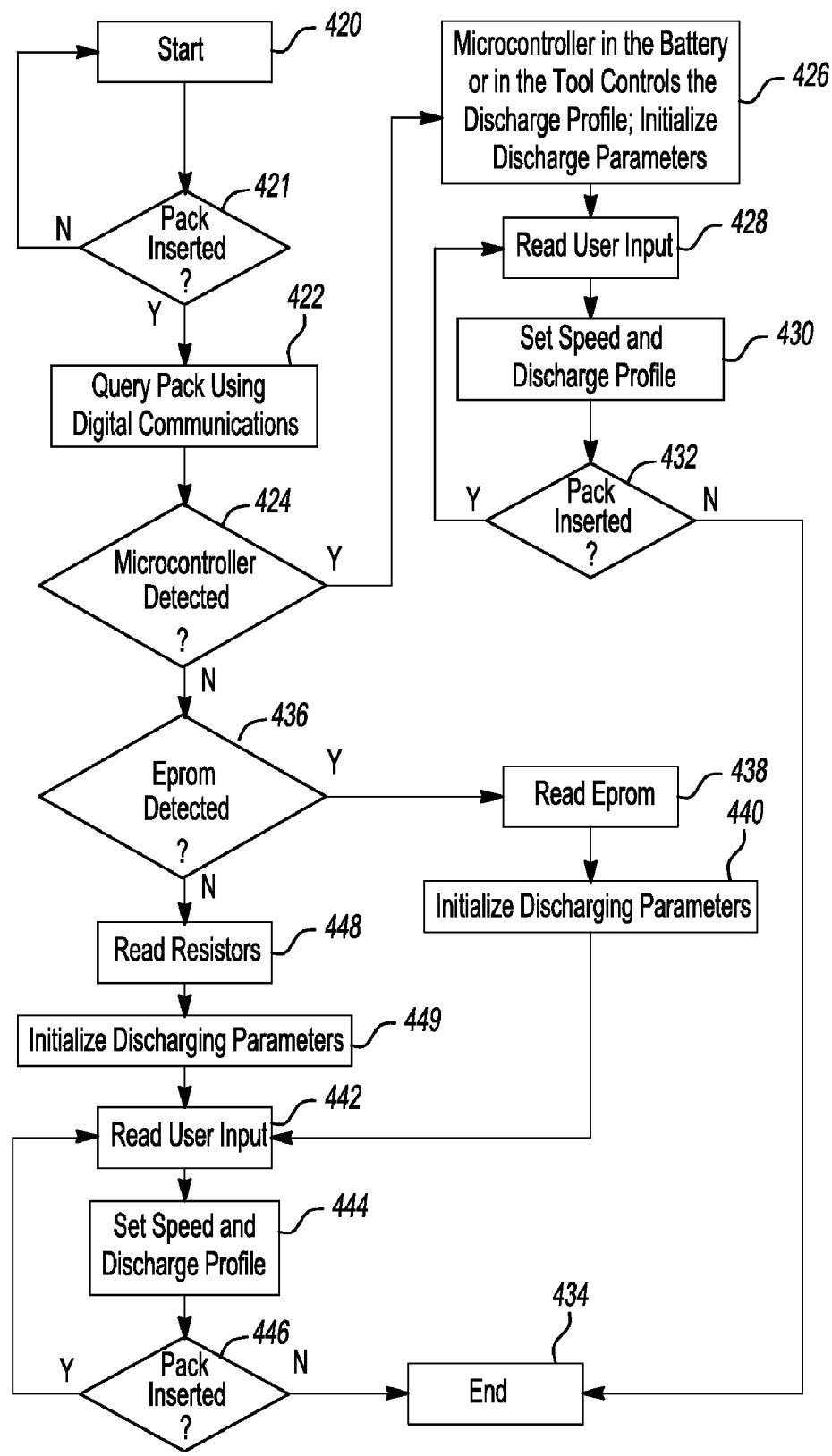
FIG. 4B is a flow chart of a simplified program for the system of FIG. 4A where the battery pack is inserted in the cordless power tool.
Figure 4C:
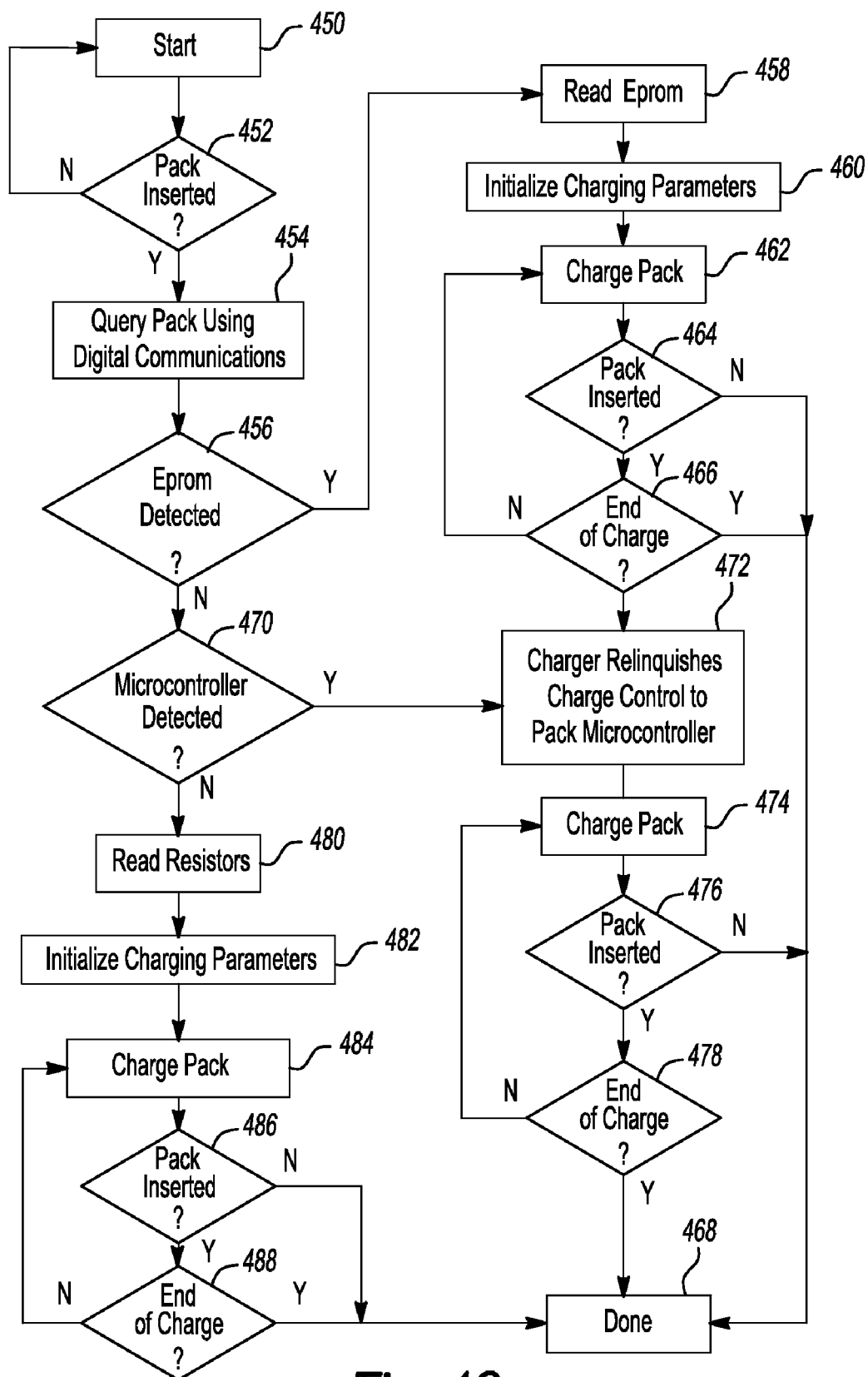
FIG. 4C is a flow chart of a simplified program for the system of FIG. 4A where the battery pack is inserted in the charger.

FIGS. 4B and 4C show illustrative flow charts for programs illustratively implemented in controller 10 of cordless power tool 1 and controller 204 of charger 200 (FIG. 4B) and in controller 204 of charger 200 and controller 206 of battery pack 4 (FIG. 4C). With reference to FIG. 4B, controller 10 of cordless power tool 1 starts at 420 and senses at 421 whether battery pack 4 is inserted in cordless power tool 1. If so, it queries battery pack 4 using digital communication at 422. If it detects at 424 that battery pack 4 has controller 206 and that controller 206 is a smart controller, such as a microcontroller, in battery pack 4, it and controller 206 determine at 426 whether controller 206 will control the discharge profile of battery pack 4 or whether cordless power tool controller 10 will control it, and control is allocated to the selected controller 10 or 206 and the selected controller 10, 206 sets initializes the discharge parameters for battery pack 4. At 428, cordless power tool controller 10 reads user input, such as the position of trigger 7, and the selected controller 10, 206 sets the speed and discharge profile of battery pack 4 for controlling motor 8 at 430. Cordless power tool controller 10 then checks at 432 whether battery pack 4 is still inserted in cordless power tool 1. If so, it returns to 428. If not, it ends at 434.

Returning to the decision block 424, if cordless power tool controller 10 did not detect that battery pack 4 had a smart controller 206, it then checks at 436 to determine if battery pack 4 has a memory, such as an EEPROM, in which information about battery pack 4 is stored. If so, it reads the memory at 438 and initializes at 440 discharge parameters based on the information it read from the memory 438. It then reads user input at 442, such as the position of trigger 7, and sets the speed and discharge profile based on that user input and the discharge parameters at 444. It then checks at 446 to see if battery pack 4 is still inserted in cordless power tool 1. If so, it returns to 442. If not, it ends at 434.

Returning to the decision block 436, if cordless power tool controller 10 did not detect that battery pack 4 had a memory device, it then reads at 448 the analog components in battery pack 4 that are used to provide information about battery pack 4. It initializes the discharge parameters based on this information at 449 and then proceeds to 442 where it reads the user input and then proceeds as discussed above.

With reference to FIG. 4C, controller 204 of charger 200 starts at 450 and at 452, checks whether battery pack 4 is inserted in charger 200. If so, it queries battery pack 4 at 454 using digital communication. If it detects at 456 whether battery pack 4 has a memory device such as an EEPROM, it reads the memory device at 458 and at 460, initializes charging parameters based on the information read from the memory device. At 462, it charges battery pack 4. At 464, it checks whether battery pack 4 is inserted in charger 200. If so, it decides at 466 whether the end of charge has been reached and goes to done at 468 if charging of battery pack 4 is finished. If not, it returns to 462. If at decision block 464 it determined that battery pack 4 is not inserted in charger 200, it goes to done at 468.

Returning to decision block 456, if charger controller 204 did not detect a memory device in battery pack 4, it then checks at 470 whether battery pack 4 has controller 206 and that it is a smart controller, such as a microcontroller. If so, charger controller 204 relinquishes control to battery pack controller 206 at 472 and under control of battery pack controller 206 charges battery pack 4 at 474. At 476 it checks whether battery pack 4 is inserted in charger 200. If so, it then determines at 478 whether the end of charge has been reached. If not, charging is continued by returning to 474. If so, it goes to done at 468. If at decision block 476 it determines that battery pack 4 is not inserted in charger 200, it goes to done at 468.

Returning to decision block 470, if charger controller 204 determines that battery pack 4 did not have a smart controller, it then reads at 480 the analog components in battery pack 4 that provide information about battery pack 4 and initializes charging parameters based on this information at 482. At 484, it charges battery pack 4 and at 486, checks whether battery pack 4 is inserted in charger 200. If so, it then determines at 488 whether the end of charge has been reached. If the end of charge has been reached, it goes to done at 468. If not, it returns to charging battery pack 4 at 484.

Figure 5:
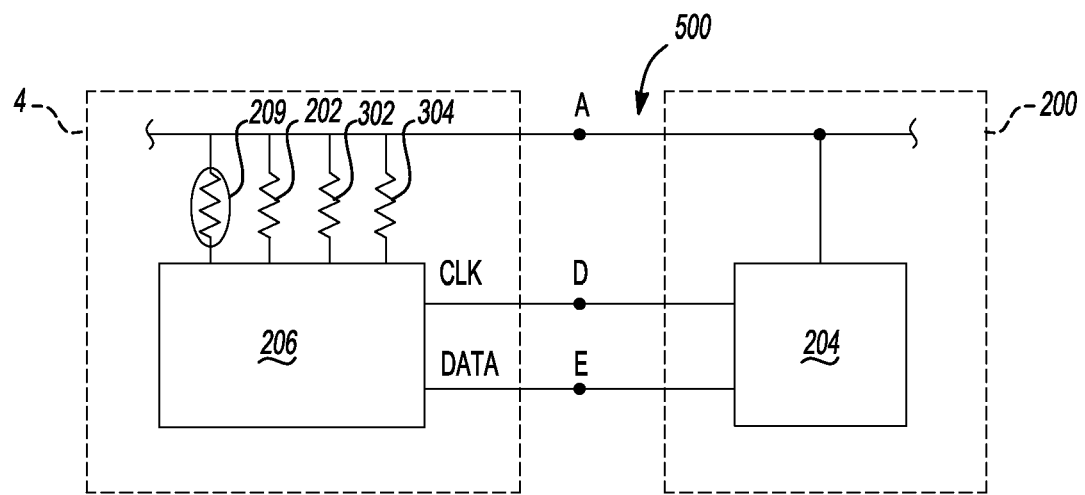
FIG. 5 is a simplified schematic diagram of a digital only identification and communication system for a cordless system in accordance with an aspect of the invention.

FIG. 5 shows a simplified schematic of a digital only identification and communication system 500. Elements in common with the embodiments shown in FIGS. 2A, 2B and 3 will be identified with like reference numbers, and the discussion will focus on the differences. While FIG. 5 shows battery pack 4 connected to charger 200, it should be understood that battery pack 4 could alternatively be connected to cordless power tool 1.

Battery pack controller 206 communicates digitally with charger controller 204 to provide information about parameters of battery pack 4 to charger 200 that charger 200 uses, such as to control the charging of battery pack 4 as discussed above. In the embodiment of digital identification and communication system 500, battery pack 4 may include analog components that identify or sense parameters of battery pack 4, such as temperature sensor 209, battery pack ID component 202, voltage resistor 302 and current resistor 304. But these analog components are coupled to inputs of battery pack controller 206 as opposed to charger 200 and battery pack controller 206 converts the information provided by these analog components to digital data which it then transfers to charger controller 204 as appropriate. It should be understood that one or more of the analog components that provide identification information, such as battery pack ID component 202, voltage resistor 302 and current resistor 304, can be replaced with data stored in a memory of or accessed by battery pack controller 206. An advantage of digital only identification and communication system 500 is that it minimizes the number of interconnections needed to transfer the maximum amount of information between the system components of the cordless system, such as between battery pack 4 and charger 200 or between battery pack 4 and cordless power tool 1.

Figure 6:
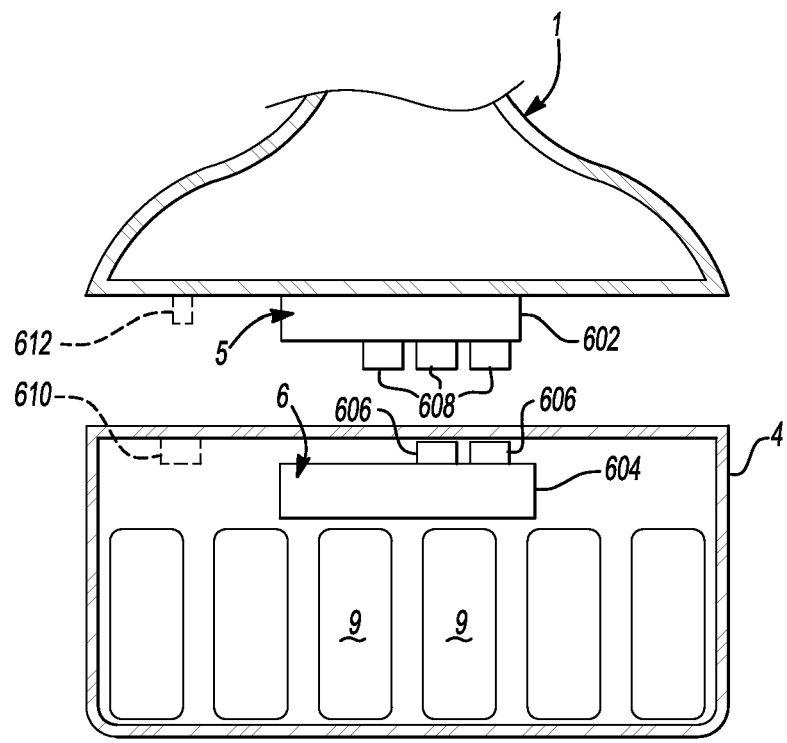
FIG. 6 is a side view of a battery pack and tool having a mechanical identification system in accordance with an aspect of the invention.

FIG. 6 shows a simplified diagram of a mechanical identification system 600. Elements in common with the embodiments shown in FIGS. 1, 2A and 2B will be identified with like reference numbers, and the discussion will focus on the differences. While FIG. 6 shows battery pack 4 connected to cordless power tool 1, it should be understood that battery pack 4 could alternatively be connected to charger 200. Mechanical identification system 600 uses mechanical elements, such as switches 608 described below, to detect the type and characteristics of the system component, such as battery pack 4, to which the system component having the switches 608 is interfaced. These switches 608 could be mechanically actuated switches actuated by mechanical switch actuating elements, such as switch actuating element 606 described below, magnetic switches actuated by embedded magnets, optical switches actuated by reflective surfaces, or the like.

Cordless power tool 1 has a terminal block 602 in which electrical elements 5 are disposed and battery pack 4 has a terminal block 604 in which electrical elements 6 are disposed. Terminal block 604 includes switch actuating elements 606 projecting upwardly, as oriented in FIG. 6, therefrom and terminal block 602 includes switches 608. When battery pack 4 is connected to cordless power tool, switch actuating elements 606 in terminal block 604 of battery pack 4 actuate corresponding switches 608 in terminal block 602 of cordless power tool 1. The number and/or configuration of switch actuating elements 606 in terminal block 604 correspond to identifying information about battery pack 4 and at least certain of its parameters. The combination of switches 608 that are then actuated and not actuated identifies the battery pack 4 and at least certain of its parameters to cordless power tool 1. For example, terminal block 604 has two switch actuating elements 606 and cordless power tool 1 has three switches 608, with two of the three switches 608 then being actuated by switch actuating elements 606 when battery pack 4 is connected to cordless power tool 1. It should be understood that terminal block 602 of cordless power tool 1 could include the switch actuating elements 606 and terminal block 604 of battery pack 4 include the switches 608, or each of terminal blocks 602, 604 include switch actuating elements 606 and switches 608.

Mechanical identification system 600 provides the benefit of reducing the number of electrical interconnections between the system components, such as battery pack 4 and cordless power tool 1, and obviates the problems caused by terminal contamination as to the information communicated using mechanical identification system 600.

In an aspect of the invention as shown in phantom in FIG. 6, battery pack 4 includes an "enable/disable" switch 610 that is actuated by a corresponding switch actuator element 612 of cordless power tool 1, which may illustratively be used to prevent short-circuiting or improper charging. It should be understood that charger 200 would, in this aspect of the invention, also have a corresponding switch actuator element. Battery pack 4 would remain disabled until enable/disable switch 610 is actuated by switch actuator element 612. Only those cordless power tools 1 and chargers 200 that are valid for use with the particular type of battery pack 4 having enable/disable switch 610 would have the corresponding switch actuator element 612. Enable/disable switch 610 may illustratively be a mechanical switch, magnetic switch or optical switch.

Figure 7A:
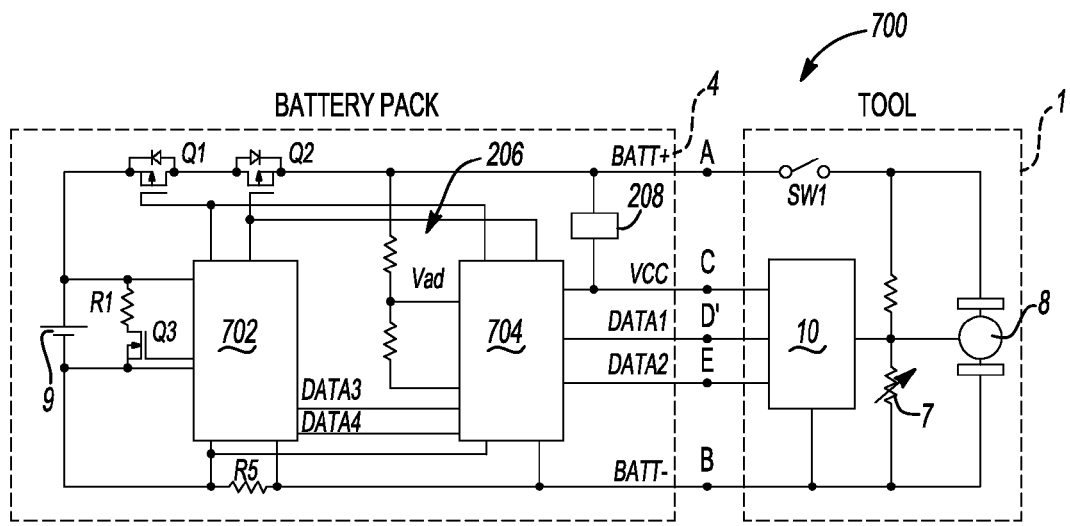
FIGS. 7A and 7B are simplified schematics of a cordless system in which the battery pack is capable of multiple modes.
Figure 7B:
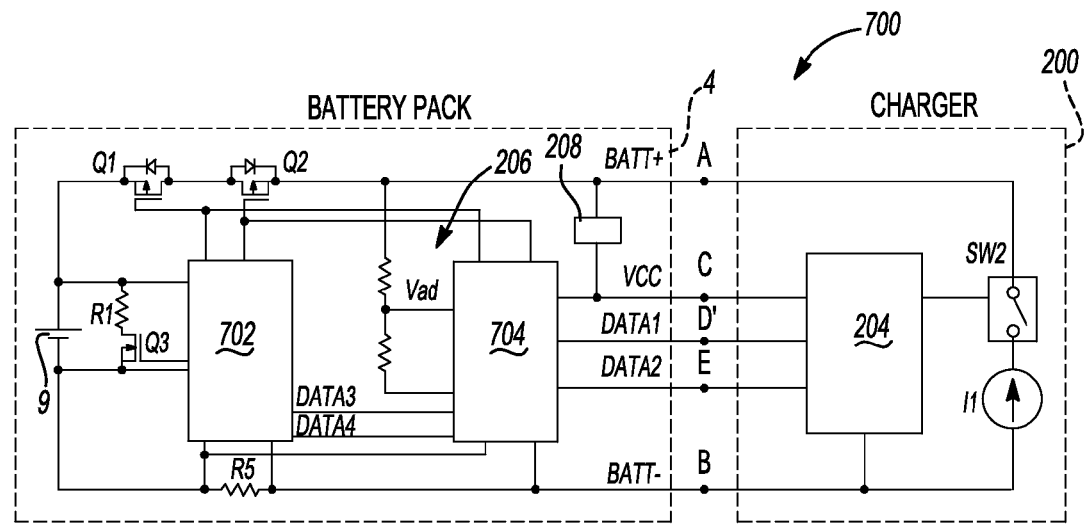

Turning to FIGS. 7A and 7B, a cordless system 700 is shown in which battery pack 4 is capable of multiple modes. Elements in common with the embodiments shown in FIGS. 1, 2A and 2B and 3 will be identified with like reference numbers, and the discussion will focus on the differences. In one mode, the intelligence in battery pack 4 is used to control the discharge profile, limits, and the like of the cordless power tool 1 to which battery pack 4 is connected. In another mode, the intelligence in battery pack 4 is used to control the charge profile, limits, and other parameters of the charger 200 to which battery pack 4 is connected.

Cordless system 700 includes battery pack 4, cordless power tool 1 and charger 200. In FIG. 7A, battery pack 4 is shown connected to cordless power tool 1 and in FIG. 7B, battery pack 4 is shown connected to charger 200. Battery pack controller 206 may illustratively include safety circuit controller 702 and microcontroller 704, although it should be understood that safety circuit controller 702 and microcontroller 704 could be combined in a single microcontroller.

Microcontroller 704 of battery pack controller 206 is illustratively programmed to control motor 8 of cordless power tool 1. Battery pack controller 206 senses that battery pack 4 is connected to cordless power tool 1 and microcontroller 704 utilizes motor control algorithms stored in its memory to control motor 8. Battery pack controller 206 may illustratively include a software authentication process, such as encryption and decryption algorithms, by which it validates the cordless power tool 1 to which battery pack 4 is connected so that only "valid" cordless power tools can be used with the battery pack 4. A "valid" cordless power tool is one that is designed to operate with the type of battery pack that battery pack 4 is.

Battery pack controller 206 then gets input, such as the position of trigger 7, from controller 10 of cordless power tool 1 via the DATA interface lines (DATA1, DATA2) interconnecting battery pack 4 with cordless power tool 1 that is uses to control motor 8. It should be understood, however, that cordless power tool 1 could be a "dumb" tool without controller 10. In which case, trigger 7 would be connected to battery pack controller 206 instead of controller 10. In another variation, cordless power tool 1 may have a memory instead of controller 10 in which would be stored data that battery pack controller 206 would use in setting up discharge profiles and limits for battery pack 4. It should be understood that other combinations of battery pack 4 and cordless power tool 1 intelligence can be used.

Battery pack controller 206 utilizes the hardware components of battery pack 4, such as Q1, Q2, Q3, R1, and R5 to control the discharge path and to sense and keep track of discharge current, battery voltage, battery temperature and other physical parameters or fault conditions. Safety circuit controller 702 and microcontroller 704 may illustratively share other hardware components in battery pack 4, such as R5, Q1, Q2, which reduces part count. Also, the control of cordless power tool 1 is implemented mainly in battery pack 4. Safety circuit controller 702 and microcontroller 704 may also be programmed to control battery pack 4 as a standard battery pack when battery pack 4 is connected to a cordless power tool 1 that has a motor control circuit, such as may illustratively be implemented using cordless power tool controller 10.

With reference to FIG. 7B, microcontroller 704 of battery pack controller 206 detects that battery pack 4 is connected to charger 200. This may include a software authentication process, such as encryption and decryption algorithms, by which microcontroller 704 validates the charger 200 to which battery pack 4 is connected so that only "valid" chargers can be used with the battery pack 4. A "valid" charger is one that is designed to charge that type of battery pack that battery pack 4 is. Information such as charge voltage, charge current, battery chemistry, capacity, temperature thresholds, and other parameters are illustratively exchanged between microcontroller 704 of battery pack controller 206 and charger controller 204. In this regard, microcontroller 704 can be programmed with charge control algorithms that microcontroller 704 uses to control charger 200 to properly charge battery cells 9 in battery pack 4.

Figure 8:
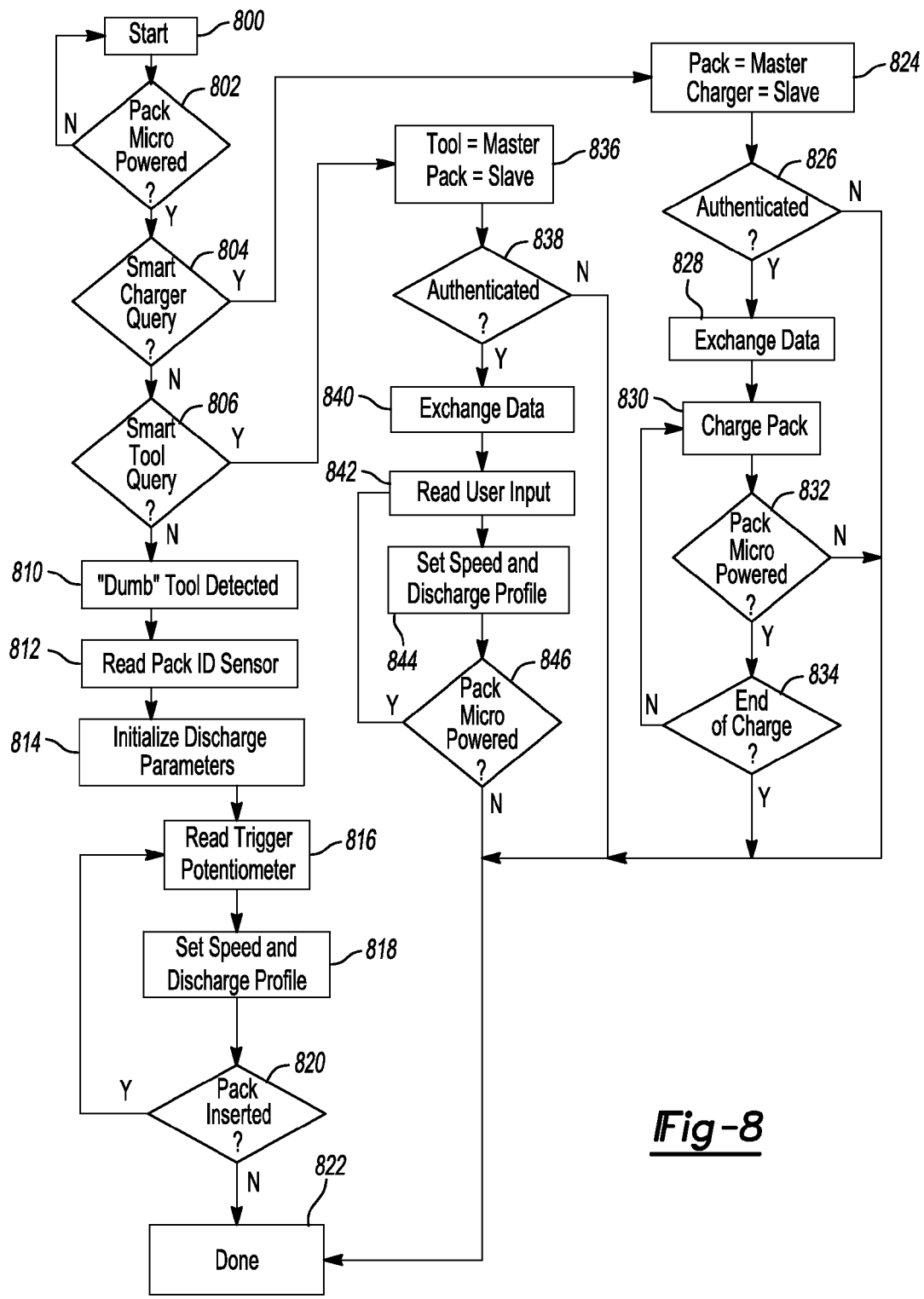
FIG. 8 is a flow chart of a simplified program for the system of FIGS. 7A and 7B.

FIG. 8 shows a simplified flow chart of an illustrative program implemented in one or more of cordless power tool controller 10, charger controller 204 and battery pack controller 206 to implement functions described above with reference to FIGS. 7A and 7B. At 800, the program starts and at 802, cordless power tool controller 10 if battery pack 4 is inserted in cordless power tool 1, or charger controller 204 if battery pack 4 is inserted in charger 200, detects whether battery pack 4 has a smart controller, such as a microcontroller. If not, the program returns to start at 800. If so, it then determines at 804 whether the query came from a "smart" charger, that is, where controller 204 of charger 200 is a "smart" device such as a microcontroller. If not, it proceeds to 806 where it determines whether the query came from a "smart" cordless power tool. If not, it determines that the cordless power tool 1 is a "dumb" tool at 810. At this point, it should be understood that the program is implemented only in battery pack controller 206 as cordless power tool 1 is a "dumb" cordless power tool. The program then reads the battery pack 4 ID resistor at 812, such as resistor 202 (FIGS. 2A and 2B) and initializes at 814 the discharge parameters that it uses to control the discharge of battery pack 4 to run motor 8 of cordless power tool 1. At 816, it reads the potentiometer of trigger 7 and at 818, sets the speed and discharge profile to control motor 8 based on this information and the discharge parameters. At 820, it checks to see if battery pack 4 is still inserted in a "dumb" cordless power tool 1, and if so, it returns to 816 where it reads the potentiometer of trigger 7. If not, it branches to done at 822.

Returning to decision block 804, if the program determines that the query came from a smart charger, that is, that battery pack 4 is inserted in a smart charger, then it branches to 824 where battery pack controller 206 is made the master and charger controller 204 is made the slave. That is, charger controller 204 will operate under control of battery pack controller 206. Battery pack controller 206 then authenticates charger 200 at 826, such as by the process discussed above, and if the authentication is not successful, branches to done at 822. If the authentication is successful, charger controller 204 and battery pack controller 206 exchange data at 828 which is then used by charger controller 204 to control the charging of battery pack 4 at 830. Illustratively, the data exchanged may include the voltage level(s) at which charger 200 charges battery pack 4 and the time at which it charges battery pack 4 at each voltage level (if more than one voltage level is used for charging). At 832, the program checks whether battery pack 4 is still inserted in charger 200, such as by checking whether the battery pack 4 has an intelligent controller. If not, it branches to done at 822. If so, it then checks at 834 whether the end of the charge has been reached. If so, it proceeds to done at 822 and if not, it branches back to 830 and continues charging the battery pack 4.

Returning to decision block 806, if the program determined that the query came from a "smart" cordless power tool 1, that is, that battery pack 4 is inserted in a smart cordless power tool, then it branches to 836 where controller 10 in cordless power tool 1 is made the master and battery pack controller 206 is made the slave. That is, battery pack controller 206 will operate under control of cordless power tool controller 10. Battery pack controller 206 then authenticates charger 200 at 838, such as by the process discussed above, and if the authentication is not successful, branches to done at 822. If the authentication is successful, charger controller 204 and battery pack controller 206 exchange data at 840 which is then used by cordless power tool controller 10 to control motor 8 of cordless power tool 1. At 842, user input, such as the position of trigger 7, is read and this input along with data exchanged at 840 is used by cordless power tool controller 10 at 844 to set the speed and discharge profile by which it controls motor 8. At 846, the program checks to see if battery pack 4 is plugged into cordless power tool 1, such as by checking to see if battery pack 4 has a "smart" controller, and if so, branches back to 842 where the user input is read. If not, it branches to done at 822.

Figure 9:
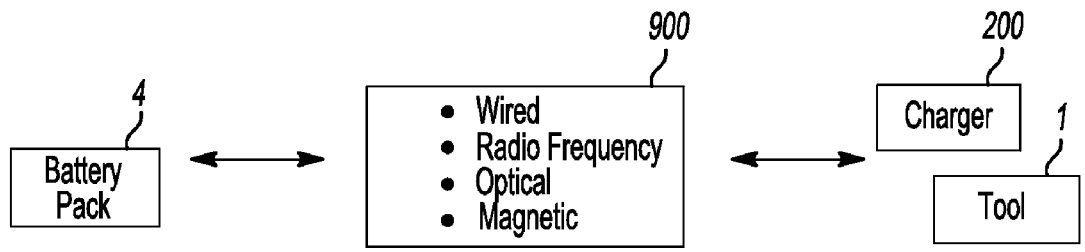
FIG. 9 is a simplified schematic diagram showing various communication interfaces between a battery pack and a charger or tool of a cordless system in accordance with an aspect of the invention.

Cordless power tool 1 and charger 200 can be interfaced to battery pack 4 using various types of communication interfaces. As shown in FIG. 9, the communication interface 900 between battery pack 4 and either of cordless power tool 1 and charger 200 can be a wired interface, a radio frequency interface, an optical interface, or a magnetic interface.

Figure 10:
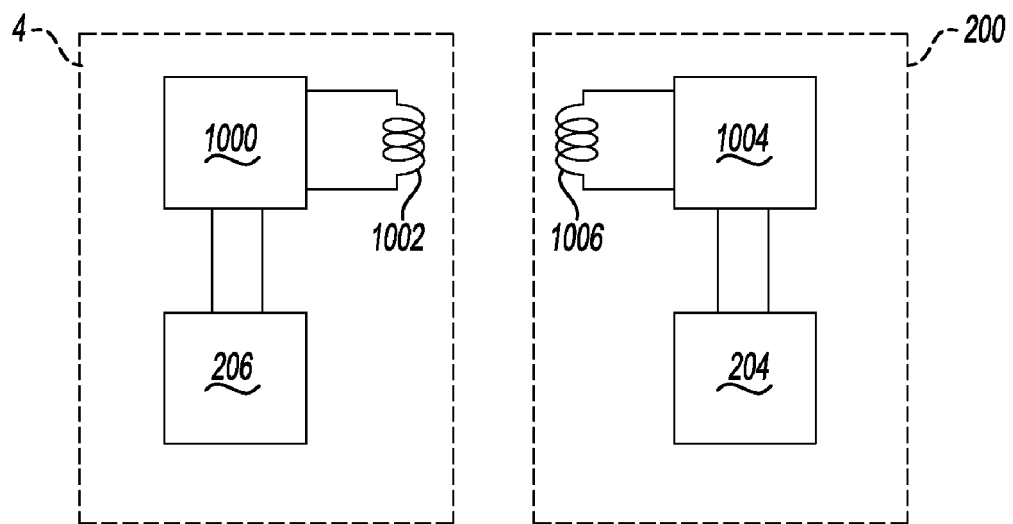
FIG. 10 is a simplified schematic of a magnetic communication interface for a cordless system in accordance with an aspect of the invention.
Figure 10:
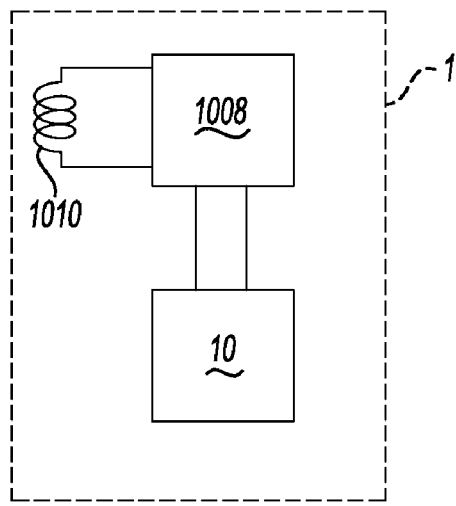

FIG. 10 shows a simplified schematic of a magnetic communication interface. Elements in common with the embodiments shown in FIGS. 1, 2A and 2B will be identified with like reference numbers. Battery pack 4 has a modulator/demodulator 1000 coupled to battery pack controller 206 and to coil 1002. Charger 200 has a modulator/demodulator 1004 coupled to charger controller 204 and to a coil 1006, and cordless power tool 1 has a modulator/demodulator 1008 coupled to cordless power tool controller 10 and to coil 1010. In the event that any of cordless power tool 1, battery pack 4 and charger 200 need only receive data, their respective coils 1002, 1006, 1010 could be a magnetic sensor, such as a hall effect sensor or a magneto resistive sensor and their respective modulator/demodulators 1000, 1004, 1008 then need only be demodulators. Known modulation techniques would be used to modulate the data, such as pulse width modulation, pulse code modulation, amplitude modulation and frequency modulation, particularly in the case of analog signals, and multiple frequency modulation (MFM), run length limited (RLL), on-off keying (OOK), phase-shift-keying (PSK), multiple-phase-shift-keying (MPSK) and frequency-shift-keying (FSK), particularly in the case digital signals.

Similarly, in a RF communication interface, an appropriate one of the above modulation schemes would be used to ensure reliable data but the cordless power tool 1, battery pack 4 and charger 200 would each have an RF connection point, such as an antenna, instead of a magnetic connection point (coils 1002, 1006 and 1010 in the embodiment shown in FIG. 10). In an optical communication interface, an appropriate one of the above modulation schemes would also be used but the cordless power tool 1, battery pack 4 and charger 200 would each have an optical connection point, such as a light source and/or optical receiver, as opposed to a magnetic connection point.

Figure 11:
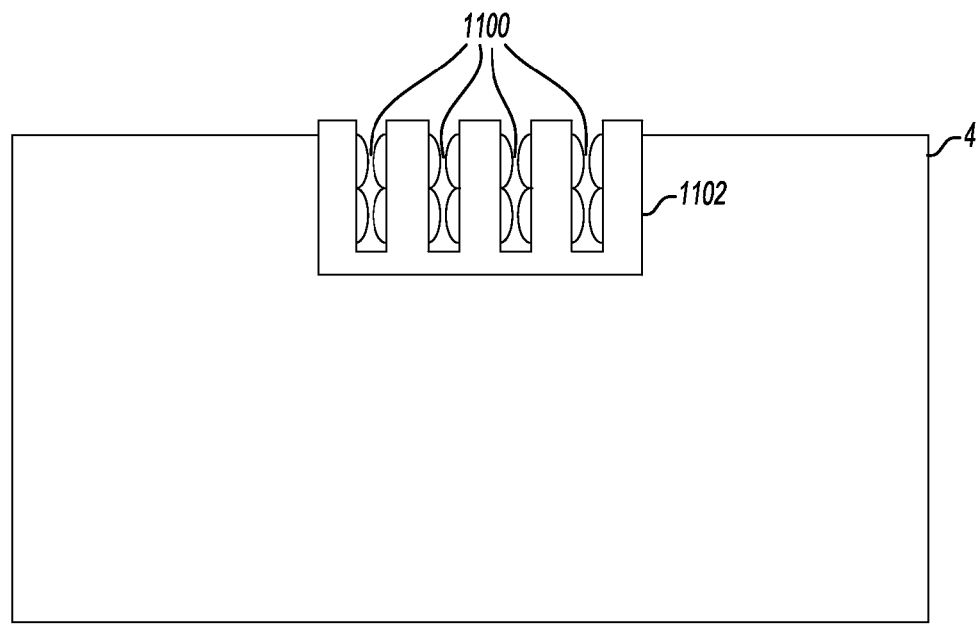
FIG. 11 is a simplified side view of a terminal block having female terminals for use in a battery pack of a cordless system in accordance with an aspect of the invention.

In aspects of the invention, battery pack 4 is protected from a variety of electrical hazards, such as from short circuits that may be caused by debris shorting the terminals of the terminal block of battery pack 4, such as terminal block 604 (FIG. 6). With reference to FIG. 11, in one aspect, female terminals 1100 are used in the terminal block 1102 of battery pack 4 to minimize the possibility of foreign objects, such as debris, unintentionally contacting the terminals in the terminal block of the battery pack 4. With reference to FIG. 11, the female terminals 1100 can be recessed within the terminal block 1102 as shown in FIG. 11, thus making it more difficult for foreign objects, such as debris, to contact them.

Figure 12A:
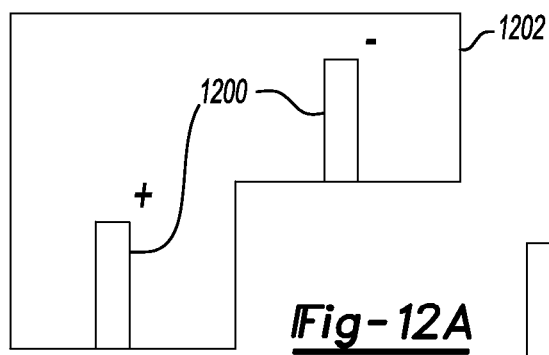
FIGS. 12A and 12B are simplified top views of a terminal block having staggered (FIG. 12A) or scattered (FIG. 12B) terminals for use in a battery pack of a cordless system in accordance with an aspect of the invention.
Figure 12B:
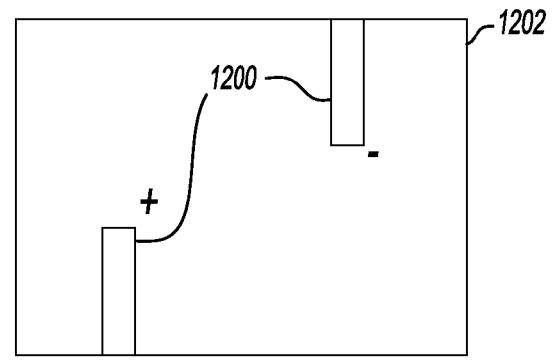

In another aspect, as shown in FIGS. 12A and 12B, terminals 1200 of terminal block 1202 of battery pack 4 (not shown in FIGS. 12A and 12 B) that are of opposite polarity are staggered (FIG. 12A) or scattered (FIG. 12B), that is, placing the terminals of opposite polarity on opposite sides of terminal block 1202 or in an asymmetrical arrangement. By staggering or scattering the terminals 1200 in terminal block 1202, the likelihood of a short circuit by conductive foreign objects bridging the terminals 1200 of opposite polarity is reduced.

Figure 13:
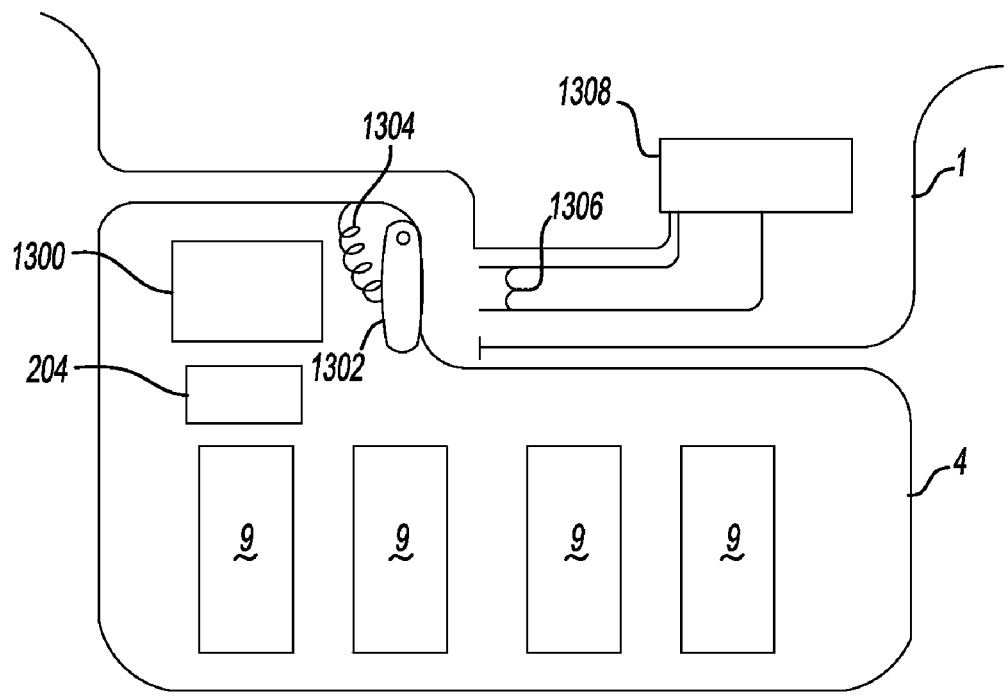
FIG. 13 is a simplified side sectional view of a battery pack having a trap door that protects the terminal block of the battery pack in accordance with an aspect of the invention.

With reference to FIG. 13, in an aspect of the invention to further protect the terminals in terminal block 1300 of battery pack 4, a trap door 1302 is provided that closes when battery pack 4 is not mated to another system device, such as cordless power tool 1. Trap door 1302 may illustratively be spring loaded and biased closed by a spring 1304 whenever battery pack 4 is not mated with another cordless system device, such as cordless power tool 1 or charger 200. When battery pack 4 is mated to another cordless system device such as cordless power tool 1 as shown in FIG. 13, or to charger 200, the terminals of that other cordless system device, such as terminals 1306 of terminal block 1308 of cordless power tool 1, urge trap door 1304 open.

Figure 14A:
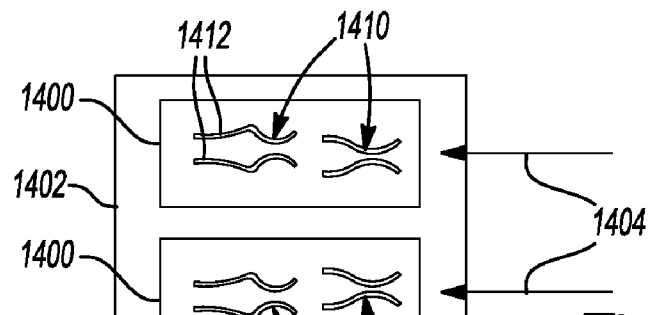
FIGS. 14A and 14B are top and side views of a multi-spring, split contact terminal in accordance with an aspect of the invention.
Figure 14B:
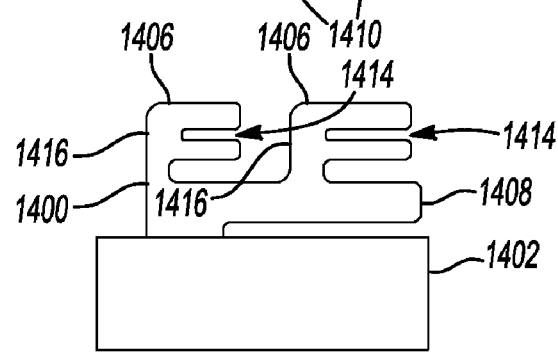

With reference to FIGS. 14A and 14B, multi-spring, split contact terminals 1400 for use in terminal block 1402 of battery pack 4 (not shown in FIGS. 14A and 14B) are shown. The terminals of the terminal block of the cordless power tool 1 or charger 200 (not shown in FIGS. 14A and 14B) are inserted laterally into terminals 1400 as shown by arrows 1404 in FIG. 14A, which is a top view of terminal block 1402. Each terminal 1400 includes first and second contacts 1406 projecting upwardly (as oriented in FIG. 14B) from a base element 1408. First and second contacts 1406 are horizontally (as oriented in FIGS. 14A and 14B) spaced from each other. Each contact 1406 includes spring contacts 1410. Each spring contact 1410 include opposed sets of tulips 1412 (only one of which is labeled in FIG. 14A for clarity) that cooperate to provide a female terminal. Each spring contact 1410 may illustratively be split so that there is a gap 1414 in the center, in effect giving each spring contact 1410 two pairs of tulips 1412 projecting horizontally (as oriented in FIG. 14B) from a vertical member 1416 of contact 1406. The two spring contacts 1410 provided by having two contacts 1406 double the contact surface area compared one contact 1406. The split design of spring contact 1410 also provides more contact area and provides a better connection in a high vibration environment. It should be understood, however, that terminal 1400 may have only one contact 1406. It should also be understood that spring contact 1410 need not be split.

Figure 15A:
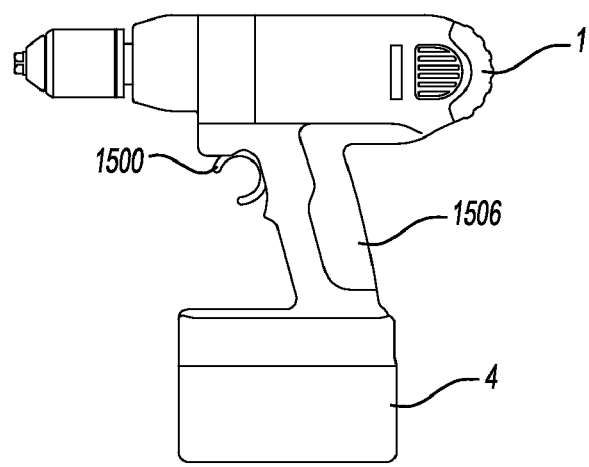
FIG. 15A is a perspective view of a cordless power tool and battery pack having a push-pull trigger that also functions as a "reverse switch" in accordance with an aspect of the invention.

In an aspect of the invention, a push-pull type of trigger of the type commonly used in transmitters for remote controlled devices, such as model cars, can advantageously be used as the trigger 1500 (FIG. 15A) of cordless power tool 1. In addition to setting the speed of motor 8, trigger 1500 is also used to reverse motor 8, eliminating the need for a separate reversing switch This control scheme is illustratively implemented in battery pack controller 206, although it should be understood that it could also be implemented in cordless power tool controller 10.

Battery pack 4 may illustratively then include H-bridge 1502 coupled to battery pack controller 206 having forward FETs F1, F2 and reverse FETs R1, R1. Trigger 1500 includes potentiometer 1504. Potentiometer 1504 is mapped according to the movement of trigger 1500 and the map is spilt at the point where trigger 1500 is at the neutral position. A dead band may illustratively be added to the map around the neutral position so that the transition between forward and reverse involves sufficient travel of trigger 1500 to avoid malfunction, that is, improperly switching between forward and reverse. In this regard, trigger systems such as used in the Futaba Magnum AM FP-T2PD Digital Proportional Radio Control System transmitters available from Great Planes Distributors of Champagne, Illinois, typically have physical adjustments to align the physical neutral position of the trigger to the desired resistance of the potentiometer within it. They may also have other features such as the ability to adjust the maximum throw of the trigger to something other than the maximum resistance of the potentiometer. This provides the ability to adjust the trigger for a specific application where the user desires a specific motor speed. The desired speed would be set at the maximum trigger travel and the user then need not have to tickle the trigger to find the desired speed.

As an example only and not by way of limitation, the resistance of potentiometer 1504 illustratively runs from 0 ohms at full reverse speed to 100K ohms at full forward speed. The neutral position would then illustratively be at about 50K ohms. The dead band would illustratively be +/−5K ohms about the neutral point, thus running from 45K ohms to 55K ohms. This would be determined by the function of battery pack controller 206 and the "trigger resistance to speed" map programmed into it. When the trigger 1500 is at the neutral position, potentiometer 1504 would have a resistance of 50K ohms which is read by battery pack controller 206, which refers to the trigger resistance to speed map and determines that none of the drive MOSFETs (F1, F2, R1, R1) of H-bridge 1502 are to be turned on.

Illustratively, when trigger 1500 is extended away from the handle 1506 of cordless power tool 1 by the user, the resistance of potentiometer 1504 would decrease toward zero ohms from 50K ohms. As the resistance of potentiometer 1504 decreases below the lower dead band limit, such as 45K ohms, battery pack controller 206 would begin to pulse width modulate the reversing MOSFETs R1, R2 at the minimum duty cycle, energizing motor 8 in the reverse direction. As the travel of trigger 1500 increases in the reverse direction, that it, is extended further away from handle 1506, which further decreases the resistance of potentiometer 1504, battery pack controller 206 increases the duty cycle to the reversing MOSFETs R1, R2 as dictated by the "trigger to resistance to speed" map in battery pack controller 206. When trigger 1500 is in the full reverse position, battery pack controller 206 would illustratively apply a 100% duty cycle to reversing MOSFETs R1, R2 thus applying full reverse power to motor 8. In an aspect of the invention, it may be desirable that less than full power be applied to motor 8 when in full reverse. This may be accomplished by adjusting trigger 1500 so that the resistance of potentiometer 1504 is greater than zero ohms when trigger 1500 is in the full reverse position, or by appropriate settings in the "trigger to resistance to speed map" in battery pack controller 206 so that the duty cycle for the full reverse position of trigger 1500 is less than 100%. For example, if it is desired to limit the speed of motor 8 when in full reverse to half-speed, the "trigger to resistance to speed map" is set to have a 50% duty cycle when trigger 1500 is in the full reverse position where potentiometer 1504 has zero ohms resistance.

When the user of cordless power tool 1 pulls trigger 1500 toward handle 1506 to run motor 8 of cordless power tool 1 in the forward direction, the resistance of potentiometer 1504 increases. As the resistance of potentiometer 1504 increases above the upper dead band limit, such as 55K ohms, battery pack controller 206 begins to pulse width modulate the forward MOSFETs F1, F2 at the minimum duty cycle. As the travel of trigger 1500 increases in the forward direction, that is, trigger 1500 is pulled closer to handle 1506, the resistance of potentiometer 1504 increases and battery pack controller 206 increases the duty cycle to the forward MOSFETs F1, F2 as dictated by the "trigger to resistance to speed" map in battery pack controller 206. When trigger 1500 is in the full forward position, battery pack controller 206 would illustratively apply a 100% duty cycle to forward MOSFETs F1, F2 thus applying full power to motor 8. In an aspect of the invention, it may be desirable that less than full power be applied to motor 8 when in full forward. This may be accomplished by adjusting trigger 1500 so that the resistance of potentiometer 1504 is less than the maximum resistance, such as 100K ohms, when trigger 1500 is in the full forward position, or by appropriate settings in the "trigger to resistance to speed map" in battery pack controller 206 so that the duty cycle for the full forward position of trigger 1500 is less than 100%. For example, if it is desired to limit the speed of motor 8 when in full forward to ¾ speed, the "trigger to resistance to speed map" is set to have a 75% duty cycle when trigger 1500 is in the full forward position where potentiometer 1504 has the maximum resistance, such as 100K ohms.

Figure 16:
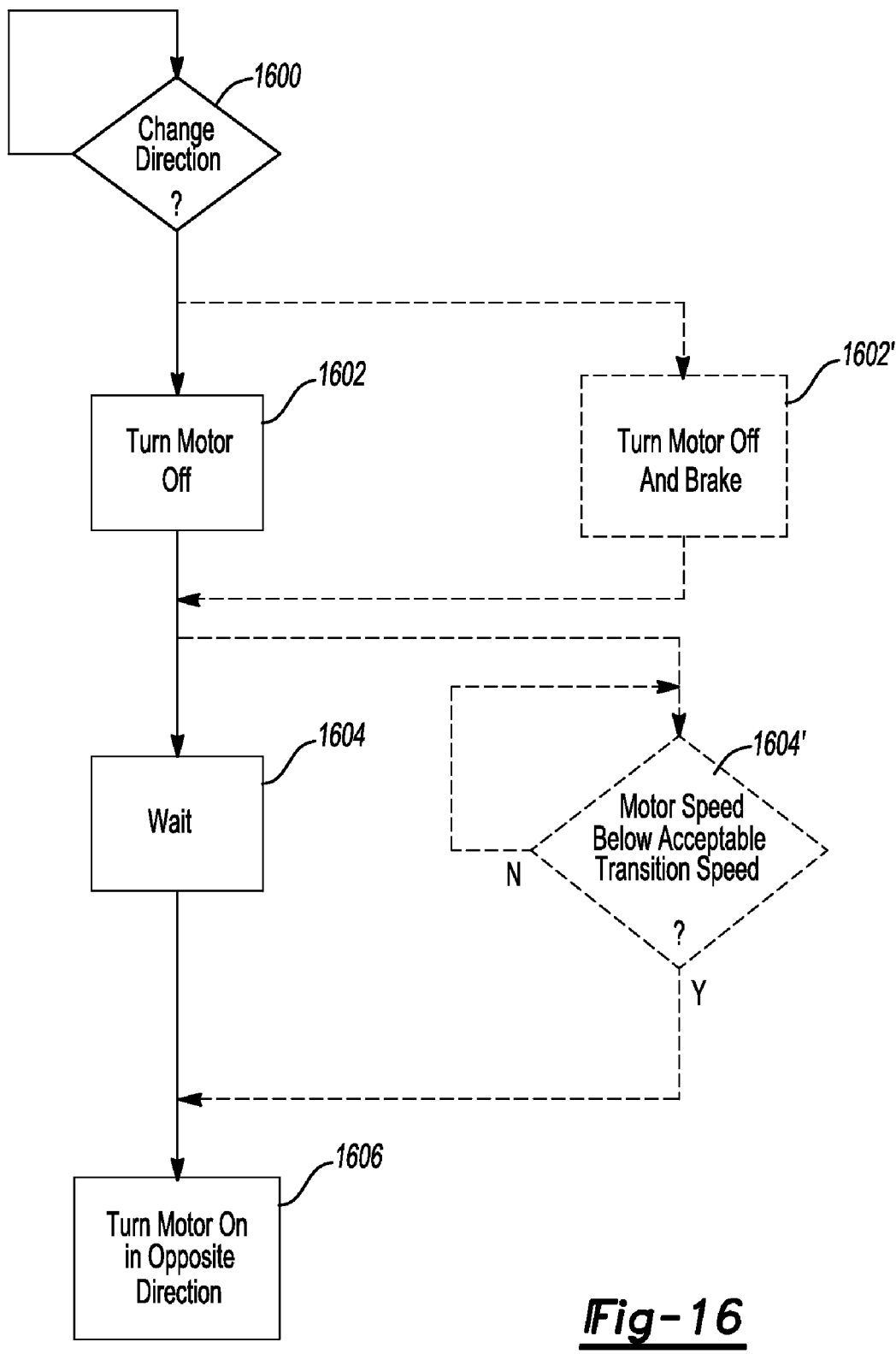
FIG. 16 is a flow chart showing a safe transition method used by the control circuit of FIG. 15B to reverse the direction of the motor of the power tool of FIG. 15A.

In an aspect of the invention, battery pack controller 206 can be programmed to provide a "safe transition" between forward and reverse to prevent damaging cordless power tool 1 by too quick a transition between fast forward and fast reverse. With reference to the flow chart of FIG. 16, at 1600 battery pack controller 206 determines whether trigger 1500 has moved between a forward and reverse position. If so, at 1602 it turns motor 8 off, delays a predetermined period at 1604, and then at 1606 turns motor 8 back on in the opposite direction. Alternatively, as shown in phantom in FIG. 16 at 1604', after turning motor 8 off, battery pack controller 206 waits until the speed of motor 8 drops below an acceptable transition speed where it is safe to change the direction of motor 8 and then turns motor 8 on in the opposite direction.

In an aspect of the invention, the upper MOSFETs F1, R1 or the lower MOSFETs F2, R2 can be used to brake motor 8. To do so, battery pack controller 206 turns the upper MOSFETs F1, R1 or the lower MOSFETs F2, R2 on at the same time, shorting the windings of motor 8. Battery pack controller 206 may illustratively pulse width modulate these MOSFET pairs to "soft brake" motor 8 as described in more detail below. In this regard, as shown in phantom at 1602', battery pack controller 206 turns motor 8 off and energizes one of the upper and lower pairs of MOSFETs F1, R1, F2, R2 to brake motor 8.

Figure 17A:
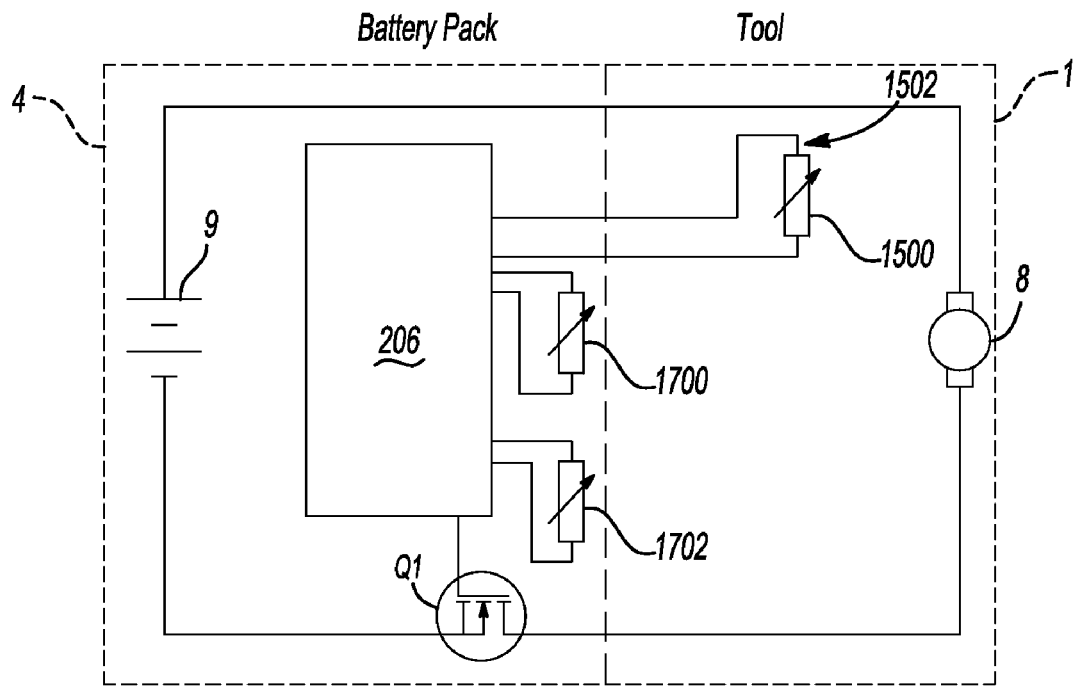
FIG. 17A is a simplified schematic showing the use of linearity adjustment potentiometers with the control circuit of FIG. 15B.
Figure 17B:
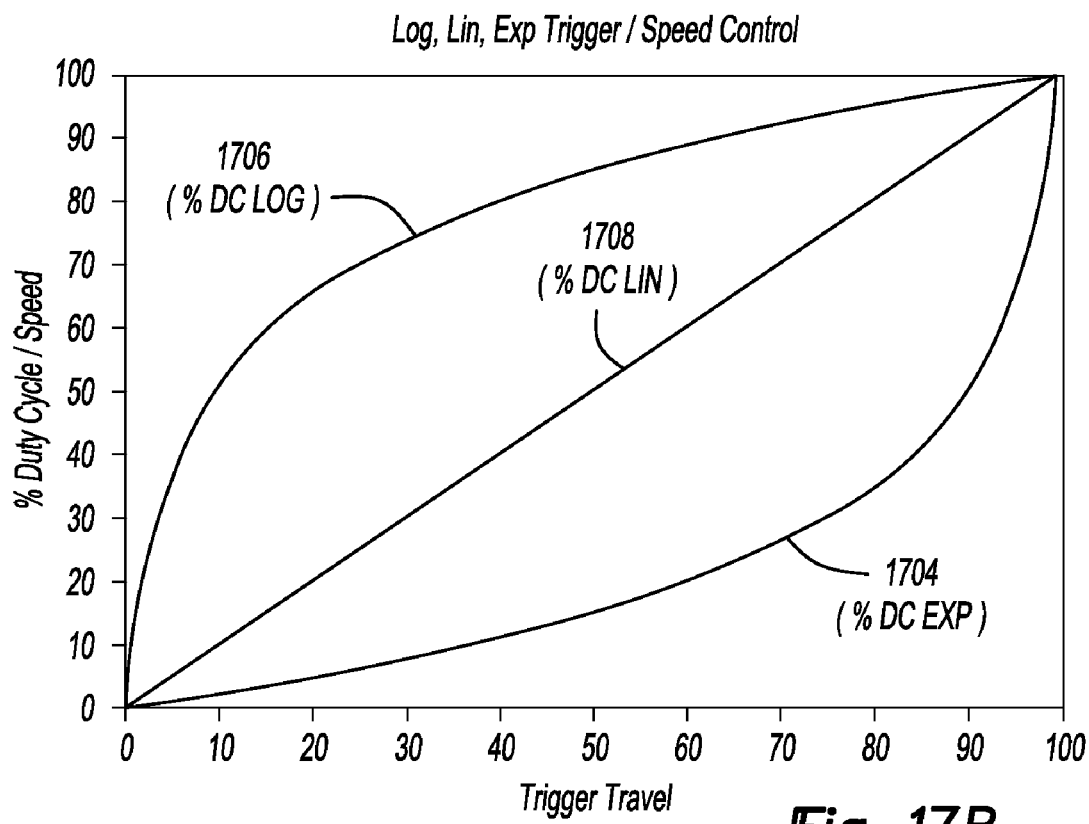
FIG. 17B is a graph showing exponential, logarithmic and linear resolution control resulting from the use of the linearity adjustment potentiometers of FIG. 17A.
Figure 17C:
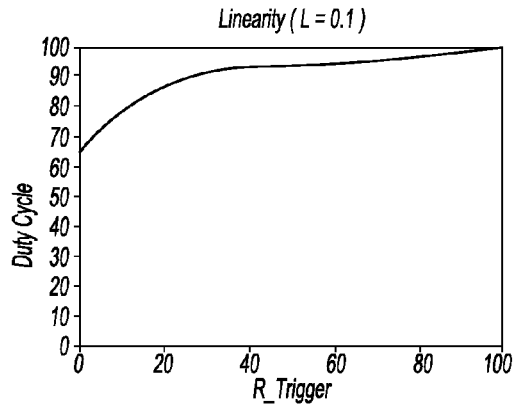
FIGS. 17C-17H are graphs showing an example of a control utilizing the linearity adjustment potentiometers.
Figure 17D:
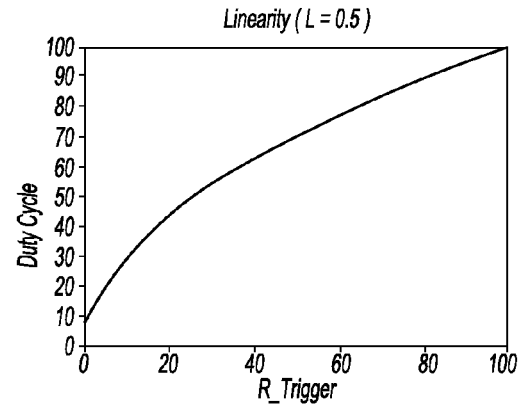
Figure 17E:
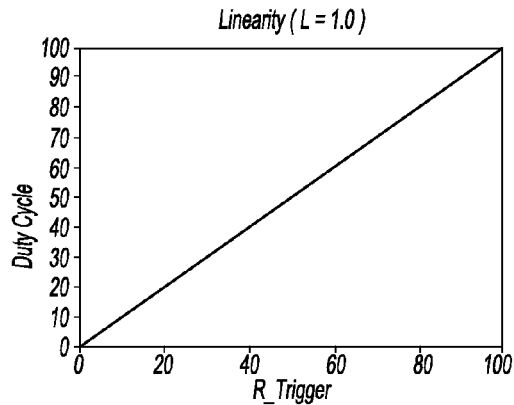
Figure 17F:
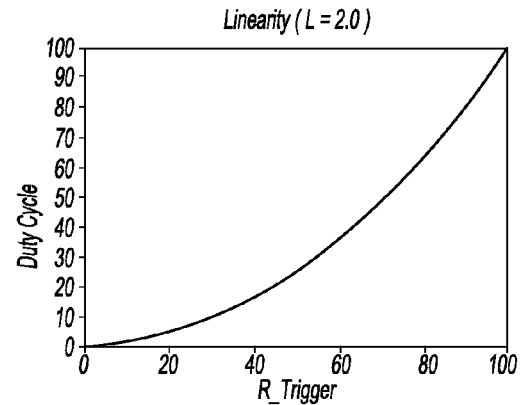
Figure 17G:
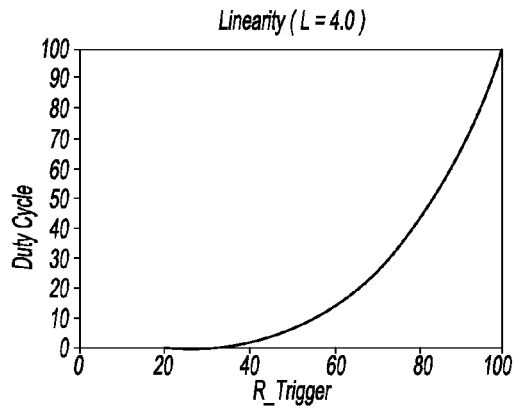
Figure 17H:
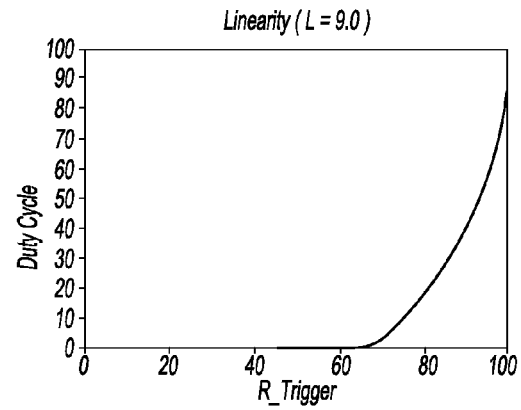

Linearity adjustment potentiometers such as are used in transmitters for the remote controlled products, such as model cars, may advantageously used in an aspect of the invention. With reference to FIGS. 17A and 17B, linearity adjustment potentiometers 1700, 1702 coupled to battery pack controller 206 are provided that allow the user to adjust the linearity of the forward and reverse portions of the trigger 1500 travel. It should be understood, however, that if cordless power tool controller 10 is used to control motor 8 instead of battery pack controller 206, linearity adjustment potentiometers 1700, 1702 would illustratively be coupled to tool controller 10. It should also be understood that if it is desired to adjust the linearity of the trigger 1500 only for the forward direction or only for the reverse direction, then only one such potentiometer 1700, 1702 would be provided. Linearity adjustment potentiometers 1700, 1702 would illustratively be coupled to battery pack controller 206 using basic potentiometer decode connection circuits typically used in connecting linearity adjustment potentiometers to RC transmitters, such as a resistor divider into an analog to digital converter.

Linearity adjustment potentiometers 1700, 1702 can be adjusted to provide exponential, logarithmic and linear decoding of the resistance of potentiometer 1504 of trigger 1500. For simplicity, only the forward direction is described with reference to forward linearity adjustment potentiometer 1700. It should be understood that reverse linearity adjustment potentiometer 1702 is adjusted in similar fashion for the reverse direction.

Exponential decoding allocates more of the throw of potentiometer to the low speed portion of the PWM curve and less to the high speed portion. Forward linearity adjustment potentiometer 1700 would illustratively be set to its maximum resistance. Battery pack controller 206, decoding a high resistance from forward linearity adjustment potentiometer 1700, would alter its formula for converting the resistance of potentiometer 1504 to speed so as to resemble the exponential curve 1704 in FIG. 17B. This allows fine control at low speeds of motor 8 and still allows full on within the normal travel of trigger 1500. With this setting, about 90% of the throw of potentiometer 1504 would be used to control the 50-100% duty cycle portion of the PWM curve and the remaining 10% used to control the 0-50% duty cycle portion of the PWM curve.

Logarithmic decoding allocates more of the throw of potentiometer to the high speed portion of the PWM curve and less to the low speed portion. Forward linearity adjustment potentiometer would be adjusted to its minimum resistance and battery pack controller 206 would alter the "trigger resistance to speed" relationship for maximum logarithmic control so as to resemble the logarithmic curve 1706 in FIG. 17B. With this setting, about 90% of the throw of potentiometer 1504 would be used to control the 0-50% duty cycle portion of the PWM curve and the remaining 10% used to control the 50-100% duty cycle portion of the PWM curve.

Linear decoding allocates an equal portion of the throw of potentiometer 1504 to both the high and low speed portions of the PWM curve. Forward linearity adjustment potentiometer would be adjusted half-way between its minimum and maximum resistance and battery pack controller would use the linear "trigger resistance to speed" relationship as shown by the linear curve 1708 in FIG. 17B. With this setting, about 50% of the throw of potentiometer 1504 would be used to control the 0-50% duty cycle portion of the PWM curve and the other 50% to control the 50-100% duty cycle portion of the PWM curve.

The following formula is an example of a formula that battery pack controller 206 may use in implementing the foregoing. For simplicity, only the forward direction is discussed. In this formula, T is the resistance of trigger 1500 potentiometer 1504, $T_{max}$ is the maximum resistance of trigger 1500 potentiometer 1504, L is the resistance of forward linearity adjustment potentiometer 1700, and DC is the duty cycle of the PWM signal to the switching device, such as Q1, that switches power to motor 8. With $0<T_R<100$, $T_{max}=100$, $0<L_R<10$, and $0<DC<100$, then $DC=(T^L)/(T_{max}^L)100$. This yields the resolution control as shown in FIGS. 17C-17H for varying settings of forward linearity adjustment potentiometer 1700. In this regard, the L variable affects linearity in a non-linear fashion in that it has a log or exponential effect in the "trigger position to speed" formula. When adjusted so the $0<L<1$, forward linearity potentiometer causes a logarithmic effect; when adjusted so that $L=1$, causes a linear effect; and when adjusted so that $1<L<10$, causes an exponential effect. The use of a logarithmic potentiometer for forward linear adjustment potentiometer 1700 would normalize this so that forward linear adjustment potentiometer would have about 1 ohm resistance at its fifty percent setting, and thus linear control would be at the fifty percent setting of forward linear adjustment potentiometer 1700.

It should be understood that the location of linearity adjustment potentiometers 1700, 1702 on battery pack 4 or cordless power tool 1 is arbitrary, but their resistance settings along with the resistance setting of trigger 1500 potentiometer 1504 need to be routed to the controller controlling the speed of motor 8, such as battery pack controller 206 or tool controller 10.

Figure 15B:
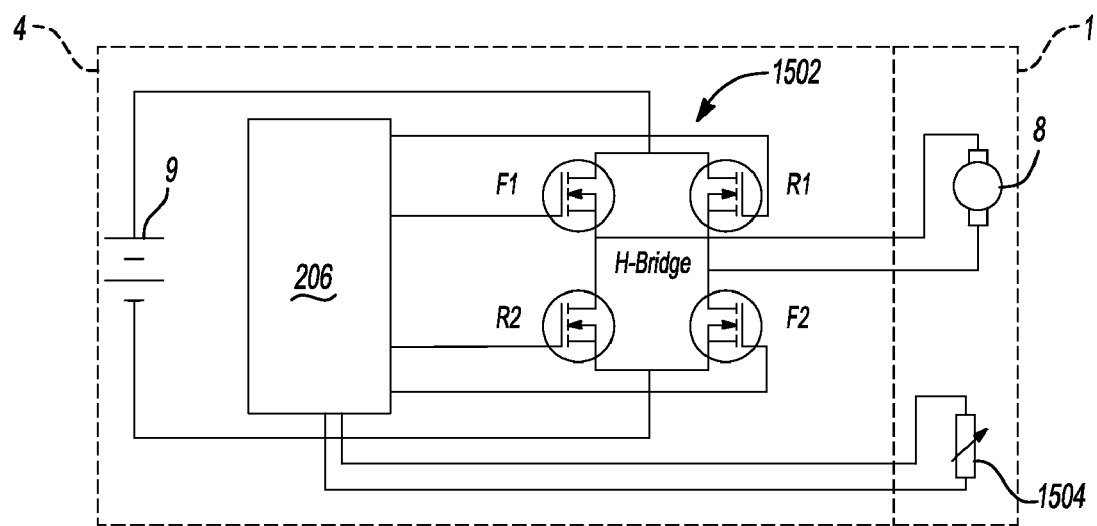
FIG. 15B is a simplified schematic of a control circuit used in the battery pack of FIG. 15A that controls the speed and direction of the motor of the cordless power tool of FIG. 15A based on the position of the push-pull trigger.

Battery pack controller 206 may illustratively be programmed to soft brake the motor 8 of cordless power tool 1. For example, with reference to the circuit of FIG. 15B, battery pack controller 206 will drive the braking pair of MOSFETs (F1, R2 or F2, R2) to short the windings of motor 8 with pulse width modulation in a ramped up manner. That is, it begins by driving the braking pair of MOSFETs with a low pulse width modulated duty cycle and ramps the duty cycle up, such as from 0% to 100%. This helps to eliminate the high current spikes and brush arcs associated with "hard braking." Hard braking is where the windings of the motor, typically the armature windings, are shorted by shorting the brushes of the motor which are kept shorted until the motor slows to the desired speed. By soft braking motor 8, motor stoppage is optimized and brush and commutator wear minimized.

Figure 18:
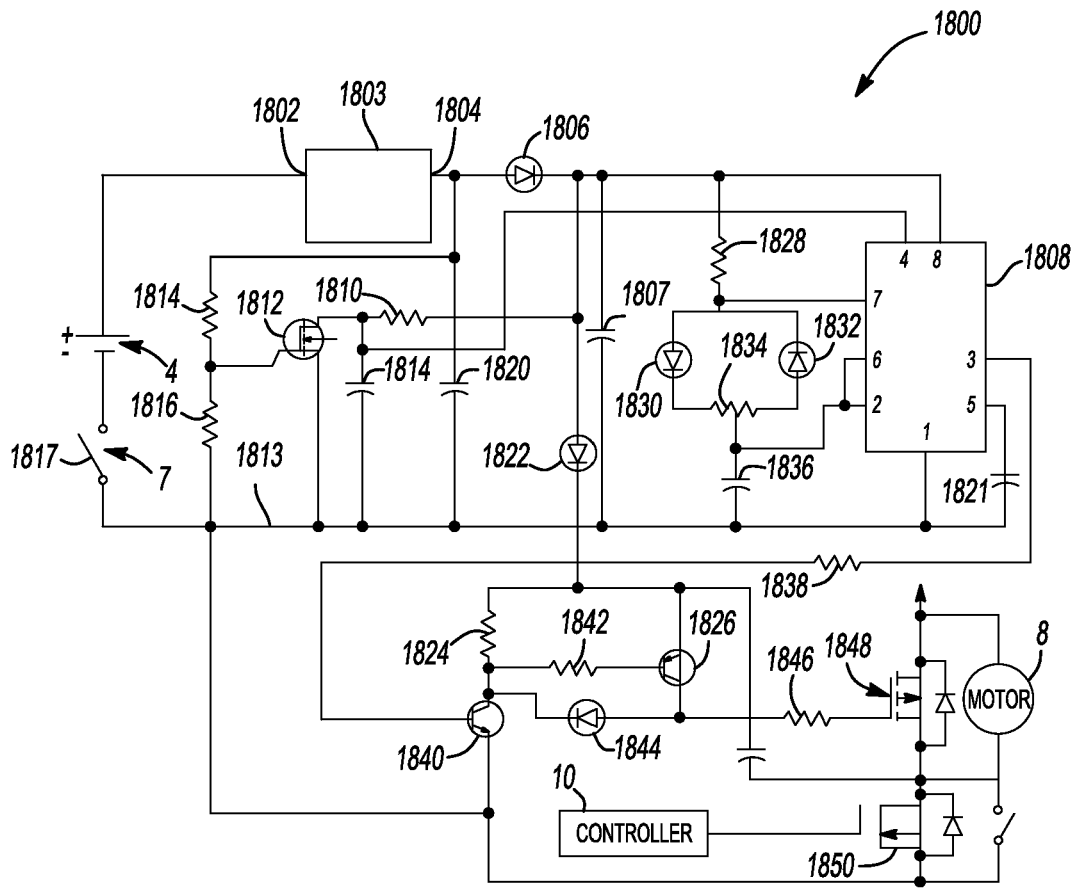
FIG. 18 is a schematic of a control circuit for a cordless power tool having a soft braking circuit.

Other soft braking techniques can be utilized, such as those disclosed in U.S. Ser. No. 10/647,807 for "Method and Device for Braking a Motor" filed Aug. 25, 2003, which is incorporated herein by reference. With reference to FIG. 18, which essentially duplicates FIG. 3 of U.S. Ser. No. 10/647,807 but with the reference numerals changed to avoid duplication, a schematic of motor control circuit 1800, illustratively included in cordless power tool 1, for controlling power to motor 8 of cordless power tool 1 that brakes motor 8 is shown. As shown in FIG. 18, the positive terminal of battery pack 4 is connected to an input 1802 of a nine volt regulator 1803. An output 1804 of nine volt regulator 1800, which provides a positive rail, is coupled to the anode of a diode 1806. The cathode of diode 1806 is coupled to a power terminal, pin 8, of a timer 1808, which is illustratively a LM 555 timer. A common terminal, pin 1, of timer 1808 is coupled to a switched common rail 1813. The cathode of diode 1806 is also coupled to one side of capacitor 1807, which is illustratively a 470 pF capacitor, and through a resistor 1810 to the drain of a FET 1812. The other side of capacitor 1807 is coupled to switched common rail 1813. The cathode of diode 1806 is also coupled through a diode 1822 to one side of a resistor 1824 and the emitter of a transistor 1826. The cathode of diode 1806 is also coupled through a resistor 1828 to pin 7 of timer 1808 and to the anode of diode 1830 and the cathode of diode 1832. The cathode of diode 1830 is coupled to one side of a potentiometer 1834 and the anode of diode 1832 is coupled to the other side of potentiometer 1834. A wiper terminal of potentiometer 1834 is coupled to pins 2 and 6 of timer 1808 and through capacitor 1836 to switched common rail 1813.

A capacitor 1818 is coupled between the drain of FET 1812 and switched common rail 1813. The drain of FET 1812 is coupled to pin 4 of timer 1808. The source of FET 1812 is coupled to switched common rail 1813 and the gate of FET 1812 is coupled to a junction of resistors 1814, 1816. The other side of resistor 1814 is coupled to output 1804 of voltage regulator 1802 and the other side of resistor 1816 is coupled to switched common rail 1813. Switched common rail 1813 is coupled through main contacts 1817 of trigger 7 to the negative terminal of battery pack 4. Capacitor 1820 is coupled between output 1804 of nine volt regulator 1802 and switched common rail 1813.

An output pin, pin 3, of timer 1808 is coupled through a resistor 1838 to a base of a transistor 1840. A collector of transistor 1840 is coupled to the other side of resistor 1824 and through a resistor 1842 to a base of transistor 1826. An emitter of transistor 1840 is coupled to switched common rail 1813. A collector of transistor 1826 is coupled to an anode of a diode 1844 and through a resistor 1846 to the gate of a FET 1848. A cathode of diode 1844 is coupled to the collector of transistor 1840.

In operation, when main contacts 1817 of trigger 7 are closed, the voltage divider formed by resistors 1814, 1816 turns on FET 1812, which pulls down terminal 4 of timer 1808 turning it off. Capacitor 1807 is charged. Cordless power tool controller 10 controls FET 1850 to switch motor 8 on and off to control the speed of motor 8.

When main contacts 1817 are opened, FET 1812 turns off, allowing pin 4 of timer 1808 to be pulled up, turning timer 1808 on. Cordless power tool controller 10 turns FET 1850 off. Timer 1808 outputs a pulse train at output pin 3 that, through transistors 1840, 1826, is provided to the gate of FET 1848, switching FET 1848 on and off to brake motor 8. Potentiometer 1834 adjusts the duty cycle and frequency of timer 1808. Alternatively, the duty cycle and frequency of timer 1808 can be set by replacing potentiometer 1834 with a resistor or resistor network.

FIG. 19 is a simplified schematic of a variation of the soft braking described with reference to FIG. 18. Cordless power tool 1 illustratively has battery pack 4 (FIG. 2B) inserted therein. In the embodiment shown in FIG. 19, battery pack controller 206 controls motor 8 of cordless power tool 1 but soft braking circuit 1900 is disposed in cordless power tool 1. In the embodiment shown in FIG. 19, trigger 7 includes a switch 1902, which may illustratively be a mechanical switch, having one side coupled through terminal A to the plus side of battery pack 4 and the other side coupled to a first power side contact 1928 of forward/reversing switch 1904. A second power side contact 1930 of forward/reversing switch 1904 is coupled to series connected semiconductors Q1, Q2 of battery pack 4 through terminal B. As discussed above, battery pack controller 206 controls the power supplied to motor 8 of cordless power tool 1 by varying the PWM duty cycle of the power supplied to motor 8 through semi-conductor Q1.

Trigger 7 also includes a switch 1906, which may illustratively be an electronic switch, having one side coupled to the first power side contact 1928 of forward/reversing switch 1904 and the other side coupled to the anode of a diode 1908. A first side of motor 8 is coupled to a first motor side contact 1932 of forward/reversing switch 1904 and a second side of motor 8 is coupled to a second motor side contact 1934 of forward/reversing switch 1904. Trigger 7 also includes a potentiometer 1910. One side of potentiometer 1910 is coupled via terminal A to the plus side of battery pack 4 and the other side of potentiometer 1910 is coupled through terminal C to a common of power supply 208 of battery pack 4. A wiper contact of potentiometer 1910 is coupled through terminal H to battery pack controller 206. The cathode of diode 1908 is coupled through capacitor 1912 to terminal B and through resistor 1914 to a power terminal 1916 of a pulsing integrated circuit 1918, which may illustratively be a LM555 timer. Power terminal 1916 is coupled through capacitor 1920 to terminal B and to the cathode of a zener diode 1922, the anode of zener diode 1922 also being coupled to terminal B. An output of pulsing integrated circuit 1918 is coupled to the switching input of an electronic switch 1924, illustratively the gate of a MOSFET which is illustratively used as electronic switch 1924. Electronic switch 1924 is coupled across the first and second power side contacts 1928, 1930 of forward/reversing switch 1904 and thus across the windings of motor 8.

When cordless power tool is being operated, trigger 7 is pulled, closing mechanical switch 1902 and opening electronic switch 1906 of trigger 7. The speed of motor 8 is controlled by battery pack controller 206 as described above. When trigger 7 is released, it opens mechanical switch 1902, which breaks the current path from battery pack 4, and also closes electronic switch 1906. Because motor 8 is rotating, back EMF is produced across the windings of motor 8. This power is coupled through electronic switch 1906 to soft braking circuit 1900 and is applied to capacitor 1912 through diode 1908 to charge capacitor 1912. Capacitor 1912 supplies power to pulsing integrated circuit 1918 and once capacitor 1912 is charged to a sufficient level, illustratively to the voltage of zener diode 1922, pulsing integrated circuit 1918 turns on and begins pulsing electronic switch 1924, illustratively at a high frequency, causing electronic switch 1924 to repeatedly turn on and off at a high frequency.

When electronic switch 1924 turns on, current created by the positive back EMF of motor 8 flows through electronic switch 1924 back into the windings of motor 8. This current generates a negative torque on motor 8 and slows it down. "Pulsing" this current to motor 8 by repeatedly switching electronic switch 1924 and off keeps the motor current from getting too high and saturating the permanent magnets of motor 8.

When trigger 7 is pulled again, electronic switch 1906 opens breaking the current path to soft braking circuit 1900, turning pulsing integrated circuit off which turns electronic switch 1924 off. Mechanical switch 1902 is closed, allowing normal current flow into motor 8 for normal operation of cordless power tool 1. Since electronic switch 1924 is coupled across the windings of motor 8, if a suitable device is used for electronic switch 1924, such as a MOSFET, it can function as a freewheeling diode during normal operation of motor 8.

Figure 19A:
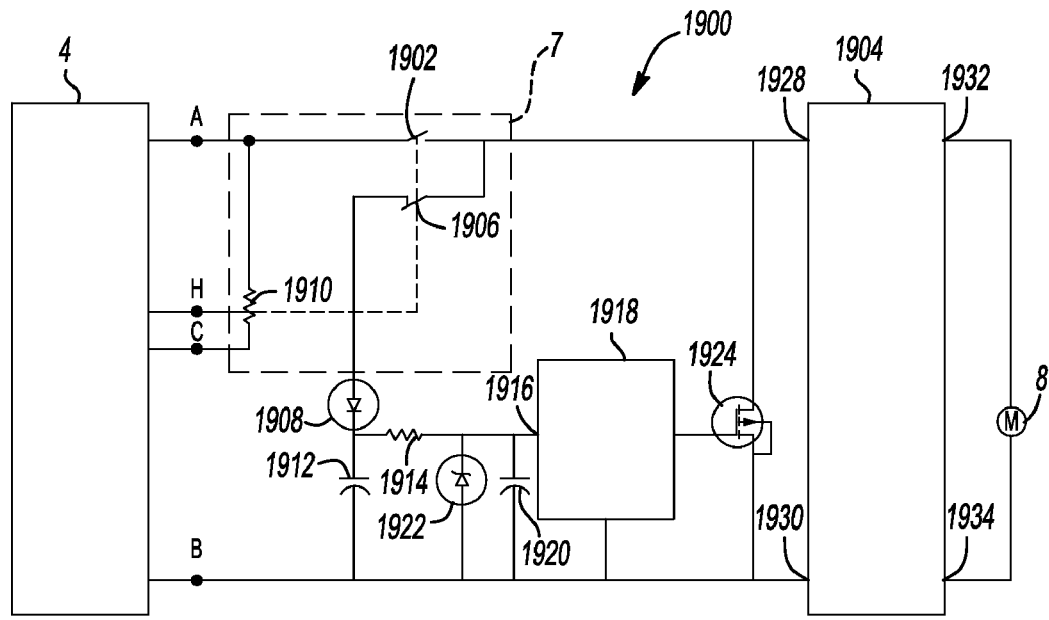
FIG. 19A and FIG. 19B are schematics of variations of the soft braking circuit of FIG. 18.
Figure 19B:
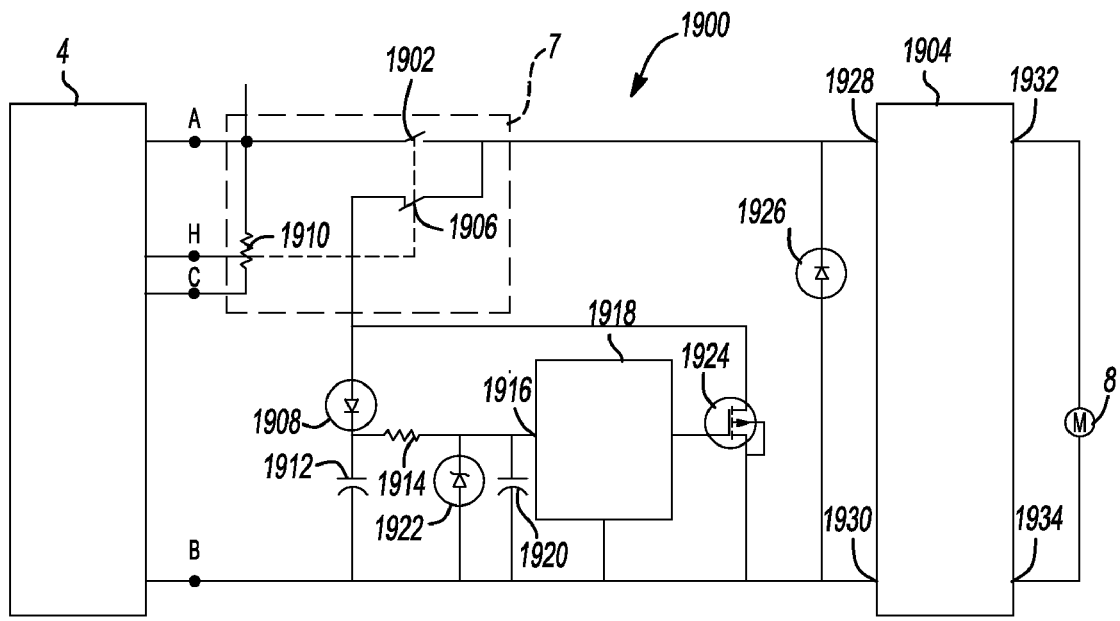

FIG. 19B is a simplified schematic showing a variation to the soft braking circuit 1900 of FIG. 19A. Like elements will be identified with the same reference numerals and the discussion will focus on the differences. In FIG. 19B, a diode 1926 is coupled across the windings of motor 8 (through forward/reversing switch 1904) to act as the freewheeling device during normal operation of motor 8. One side of electronic switch 1924 is then coupled to the junction of electronic switch 1906 of trigger 7 and diode 1908 instead of to the first power side contact 1928 of forward/reversing switch 1904. By coupling one side of electronic switch 1924 to electronic switch 1906 in this manner, power is disconnected to electronic switch 1924 by the opening of electronic switch 1906 when trigger 7 is pulled, which prevents the possibility of any shoot through from electronic switch 1924 being actively powered when mechanical switch 1902 is closed when trigger 7 is pulled.

An advantage of the soft braking circuit 1900 is that the back EMF of motor 8 is used to power it. Thus, there is no need for circuitry to keep a soft braking circuit powered at all times. By putting soft braking circuit 1900 in cordless power tool 1, it is self-contained in cordless power tool 1 and there is thus no need for any communication between battery pack 4 and cordless power tool 1 to operate it.

In an aspect of the invention, cells 9 of battery pack 4 are Lithium Ion cells and cordless power tool 1 or battery pack 4 includes soft braking for motor 8 of cordless power tool 1.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A battery pack for a cordless power tool system that includes a plurality of system components, the battery pack comprising a housing in which a plurality of battery cells are disposed and a controller that determines, when the battery pack is coupled to a system component whether the system component is a smart system component having a controller or a dumb system component that does not have a controller wherein the plurality of system components include a cordless power tool and upon determining that the power tool is a smart system component, the battery pack controller is set to a slave to the power tool controller and exchanges data with the power tool controller for use by the power tool controller in controlling the power tool, and upon determining that the power tool is a dumb system component, the battery pack controller controlling the dumb power tool.

2. The apparatus of claim 1 wherein the plurality of system components include a cordless power tool and a charger.

3. The apparatus of claim 1 wherein the power tool controller when the power tool is a smart system component reads a trigger potentiometer of the power tool and sets a speed and discharge profile based on data exchanged between the battery pack controller and the power tool controller and the trigger potentiometer reading by which the power tool controller controls a motor of the power tool.

4. The apparatus of claim 1 wherein the battery pack controller in controlling the dumb power tool initializes discharge parameters, reads a trigger potentiometer of the dumb power tool and sets a speed and discharge profile to control a motor of the dumb power tool based on the discharge parameters and trigger potentiometer reading.

5. The apparatus of claim 1 wherein the plurality of system components include a charger and upon determining that the charger is a smart system component, the battery pack controller exchanges data with the charger controller for use by the charger controller in controlling the charger.

6. The apparatus of claim 5 wherein when the battery pack controller determines that the charger is a smart system component, the battery pack controller is set to a master and the charger controller is set to a slave.

7. The apparatus of claim 1 wherein the plurality of battery cells include a plurality of Lithium ion battery cells.

8. A cordless power tool system, comprising a plurality of system components including a battery pack and a cordless power tool, the battery pack comprising a housing in which a plurality of battery cells are disposed and a controller that determines, when the battery pack is coupled to a system component, whether the system component is a smart system component having controller or a dumb system component that does not have a controller wherein the system component to which the battery pack is coupled is the power tool and upon the battery pack controller determining that the power tool is a smart system component, the battery pack controller is set to a slave to the power tool controller and exchanges data with the power tool controller that the power tool controller uses in controlling the power tool, and upon determining that the power tool is a dumb system component, the battery pack controller controlling the dumb power tool.

9. The apparatus of claim 8 wherein the plurality of battery cells include a plurality of Lithium Ion battery cells.

10. The apparatus of claim 8 wherein the power tool controller when the power tool is a smart system component reads a trigger potentiometer of the power tool and sets a speed and discharge profile based on data exchanged between the battery pack controller and the power tool controller and the trigger potentiometer reading by which the power tool controller controls a motor of the power tool.

11. The apparatus of claim 8 wherein the battery pack controller in controlling the dumb power tool initializes discharge parameters, reads a trigger potentiometer of the dumb power tool and sets a speed and discharge profile to control a motor of the dumb power tool based on the discharge parameters and trigger potentiometer reading.

12. The apparatus of claim 8 wherein the plurality of system components include a charger, and, when the battery pack is coupled to the charger, the battery pack controller upon determining that the charger is a smart system component exchanges data with the charger controller that the charger controller uses in controlling the charger.

13. The apparatus of claim 12 wherein when the battery pack controller determines that the charger is a smart system component, the battery pack controller is set to a master and the charger controller is set to a slave.

* * * * *